(12) United States Patent
Kim

(10) Patent No.: US 12,276,517 B2
(45) Date of Patent: Apr. 15, 2025

(54) GAS FUEL-BASED MOVING OBJECT CAPABLE OF CHECKING THE AMOUNT OF GAS FILLING ACCORDING TO FILLING SPECIFICATION AND METHOD FOR PROVIDING FILLING AMOUNT USING THE SAME

(71) Applicants: Hyundai Motor Company, Seoul (KR); Kia Corporation, Seoul (KR)

(72) Inventor: Kyoung Joo Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 347 days.

(21) Appl. No.: 17/872,430

(22) Filed: Jul. 25, 2022

(65) Prior Publication Data

US 2023/0194296 A1 Jun. 22, 2023

(30) Foreign Application Priority Data

Dec. 16, 2021 (KR) .......... 10-2021-0180674

(51) Int. Cl.
*G01C 21/36* (2006.01)
*B60L 58/30* (2019.01)
(Continued)

(52) U.S. Cl.
CPC .......... *G01C 21/3691* (2013.01); *B60L 58/30* (2019.02); *F17C 5/007* (2013.01); *F17C 5/06* (2013.01); *F17C 13/025* (2013.01); *F17C 13/026* (2013.01); *G01C 21/3469* (2013.01); *G01C 21/3626* (2013.01); *G01C 21/3697* (2013.01); *H01M 8/04089* (2013.01);
(Continued)

(58) Field of Classification Search
CPC .......... G01C 21/3691; G01C 21/3469; G01C 21/3626; G01C 21/3697; B60L 58/30; B60L 2260/52; F17C 5/007; F17C 5/06; F17C 13/025; F17C 13/026; F17C 2221/012; F17C 2223/0123; F17C 2225/0123; F17C 2250/072; F17C 2270/0168; H01M 8/04089; H01M 8/04201; H01M 8/04328; H01M 8/04388; H01M 8/04753; H01M 2250/20
See application file for complete search history.

(56) References Cited

U.S. PATENT DOCUMENTS 5,810,058 A * 9/1998 Kountz ................. F17C 13/026
    141/2
6,619,336 B2 * 9/2003 Cohen ..................... F17C 13/02
    141/82

(Continued)

FOREIGN PATENT DOCUMENTS

WO    WO-2011092560 A1 * 8/2011 ............. F17C 5/007

*Primary Examiner* — Nicolas A Arnett
(74) *Attorney, Agent, or Firm* — Fox Rothschild LLP

(57) ABSTRACT

Disclosed is a gas fuel-based moving object capable of checking the amount of gas filling according to filling specification and method therefor. The moving object includes: a transceiver configured to receive filling specification information of a gas charger; and a processor configured to estimate, based on the filling specification information, a maximum possible filling amount of gas injected to a fuel tank of the moving object and to provide the maximum possible filling amount through a user interface.

19 Claims, 16 Drawing Sheets

(51) Int. Cl.
    *F17C 5/00*         (2006.01)
    *F17C 5/06*         (2006.01)
    *F17C 13/02*       (2006.01)
    *G01C 21/34*       (2006.01)
    *H01M 8/04082*     (2016.01)
    *H01M 8/04089*     (2016.01)
    *H01M 8/0432*      (2016.01)
    *H01M 8/0438*      (2016.01)
    *H01M 8/04746*     (2016.01)

(52) U.S. Cl.
    CPC ... *H01M 8/04201* (2013.01); *H01M 8/04328* (2013.01); *H01M 8/04388* (2013.01); *H01M 8/04753* (2013.01); *B60L 2260/52* (2013.01); *F17C 2221/012* (2013.01); *F17C 2223/0123* (2013.01); *F17C 2225/0123* (2013.01); *F17C 2250/072* (2013.01); *F17C 2270/0168* (2013.01); *H01M 2250/20* (2013.01)

(56) References Cited

U.S. PATENT DOCUMENTS

| | | | | |
|---|---|---|---|---|
| 7,350,604 | B2 * | 4/2008 | Veenstra | F17C 13/123 429/444 |
| 8,662,115 | B2 * | 3/2014 | Mori | B67D 7/348 141/2 |
| 10,078,000 | B2 * | 9/2018 | Kampitsch | G01F 23/80 |
| 10,856,104 | B2 * | 12/2020 | Sakurada | H04W 4/021 |
| 10,995,913 | B2 * | 5/2021 | Fujita | F17C 13/025 |
| 11,274,794 | B2 * | 3/2022 | Ogiwara | F17C 5/06 |
| 11,572,982 | B1 * | 2/2023 | Lerner | F17C 13/12 |
| 11,787,285 | B2 * | 10/2023 | Barkow | B67D 7/08 141/1 |
| 11,815,228 | B2 * | 11/2023 | Kwon | F17C 5/007 |
| 12,025,452 | B2 * | 7/2024 | Lee | G01C 21/3476 |
| 2017/0021726 | A1 * | 1/2017 | Kim | B60K 35/60 |
| 2022/0367891 | A1 * | 11/2022 | Park | B67D 7/0401 |

* cited by examiner

[LIST OF REFILL STATIONS RETRIEVED AROUND ROUTE]

| REFILL STATION | DISTANCE FROM CURRENT LOCATION(Km) | DRIVABLE DISTANCE AFTER ARRIVAL AT DESTINATION (Dr; Km) | FUEL UNIT PRICE (Co; KRW/Kg) | EXPECTED ARRIVAL TIME TO DESTINATION(Td) | DISTANCE FROM CURRENT LOCATION TO DESTINATION(D; Km) | DISTANCE FROM DESTINATION TO NEAREST REFILL STATION(Ds; Km) |
|---|---|---|---|---|---|---|
| HS1 | 10 | 50 | 10,100 | 14:30 | 220 | 45 |
| HS2 | 25 | 80 | 10,300 | 14:40 | | |
| HS3 | 30 | 60 | 10,200 | 14:25 | | |
| HS4 | 80 | 200 | 10,500 | 14:35 | | |
| HS5 | 110 | 300 | 10,400 | 14:45 | | |
| HS6 | 15 | 40 | 10,000 | 14:20 | | |

FIG. 11A

[LIST OF REFILL STATIONS PRESENT TO USER]

| REFILL STATION | DISTANCE FROM CURRENT LOCATION(Km) | DRIVABLE DISTANCE AFTER ARRIVAL AT DESTINATION (Dr ; Km) | FUEL UNIT PRICE (Co; KRW/Kg) | EXPECTED ARRIVAL TIME TO DESTINATION(Td) | DISTANCE FROM CURRENT LOCATION TO DESTINATION(D; Km) | DISTANCE FROM DESTINATION TO NEAREST REFILL STATION(Ds; Km) |
|---|---|---|---|---|---|---|
| HS1 | 10 | 50 | 10,100 | 14:30 | 220 | 45 |
| HS2 | 25 | 80 | 10,300 | 14:40 | | |
| HS3 | 30 | 60 | 10,200 | 14:25 | | |
| HS4 | 80 | 200 | 10,500 | 14:35 | | |
| HS5 | 110 | 300 | 10,400 | 14:45 | | |

FIG. 11B

GAS FUEL-BASED MOVING OBJECT CAPABLE OF CHECKING THE AMOUNT OF GAS FILLING ACCORDING TO FILLING SPECIFICATION AND METHOD FOR PROVIDING FILLING AMOUNT USING THE SAME

CROSS REFERENCE TO RELATED APPLICATION

The present application is based on and claims under 35 U.S.C. § 119(a) the benefit of a Korean patent application 10-2021-0180674, filed Dec. 16, 2021, the entire contents of which are incorporated herein for all purposes by this reference.

TECHNICAL FIELD

Embodiments of the present disclosure relate to a gas fuel-based moving object capable of checking an amount of gas filling according to a filling specification and a method for providing a filling amount using the same, and more particularly, to a moving object capable of providing a user with a maximum possible filling amount of gas injected into the moving object according to a filling specification of a gas filling station and a method for providing a filling amount using the same.

BACKGROUND

Recently, vehicles based on electrical energy have emerged and are being commercialized. In those vehicles, secondary batteries or fuel cells are used as sources of electrical energy. A vehicle using a fuel cell may employ gas, for example, hydrogen as fuel and may be driven by electrical energy that the fuel cell generates by a chemical reaction between hydrogen and oxygen.

Like internal combustion engine vehicle, fuel cell vehicles use hydrogen stored in fuel tanks and need to refill it after a certain distance of running. In order to charge a fuel cell vehicle with hydrogen, a high-pressure hydrogen gas may be put into a fuel tank through a fuel intake. Herein, as the hydrogen thus supplied is in a gaseous state, the hydrogen gas can be smoothly put into the fuel tank only when the supply pressure of a filling station is higher than the fuel tank pressure of the vehicle. When a hydrogen gas with a sufficiently high pressure is prepared in the filling station, it may take a short time to put hydrogen into the vehicle, and this is considered as an advantage as compared to secondary battery vehicles requiring a long charge time.

However, when cell fuel vehicle based on hydrogen are actually operated, generating a high-pressure hydrogen gas for hydrogen charging may take a longer time than a time required for hydrogen charging, a problem of time delay may occur during hydrogen charging.

In addition, incomplete charging of hydrogen in a fuel tank may frequently occur according to an installation condition of a filling station. A fuel tank of a hydrogen-based vehicle may be fabricated with various permissible pressures. Besides, a filling station may have hydrogen chargers with various maximum supply pressures in order to support various demands of fuel tanks. Accordingly, when a maximum supply pressure of a hydrogen charger is lower than a permissible pressure of a fuel tank, a hydrogen supplied to a vehicle may be put up to a hydrogen amount corresponding to the maximum supply pressure. Thus, the vehicle may not be completely charged. In order to prevent such a situation, a low-pressure hydrogen charger uses a method of supercooling compressed hydrogen gas at a very low temperature and supplying hydrogen. Nevertheless, the low-pressure hydrogen charger has a limitation in completely filling a fuel tank having a high permissible pressure.

The situation and limitation described above may cause not only discomfort in a user's recognizing a filling amount according to a state of a charger but also difficulty in establishing a driving plan due to a post-filling driving distance short than expected.

SUMMARY

Embodiments of the present disclosure are directed to provide a gas fuel-based moving object capable of providing a user with a maximum possible filling amount of gas injected into the moving object according to a filling specification of a gas filling station and a method for providing a filling amount using the same.

The technical objects of embodiments of the present disclosure are not limited to the above-mentioned technical objects, and other technical objects that are not mentioned will be clearly understood by those skilled in the art through the following descriptions.

According to embodiments of the present disclosure, there is provided a gas fuel-based moving object capable of checking the amount of gas filling according to filling pressure, the moving object comprising: a transceiver configured to receive filling specification information of a gas charger; and a processor configured to estimate, based on the filling specification information, a maximum possible filling amount of gas injected to a fuel tank of the moving object and to provide the maximum possible filling amount through a user interface.

According to the embodiment of the present disclosure in the moving object, the filling specification information may comprise at least one of information on a maximum possible filling pressure applied to gas injection by the gas charger and information on a supply temperature of the injected gas.

According to the embodiment of the present disclosure in the moving object, the maximum possible filling amount may be estimated based on permissible pressure information corresponding to a full charge of the fuel tank, the information on the maximum possible filling pressure, and the information on the supply temperature. According to the embodiment of the present disclosure in the moving object, the permissible pressure information may be determined depending on ambient temperature information of the moving object and tank temperature information of the fuel tank, which are obtained during the gas injection.

According to the embodiment of the present disclosure in the moving object, wherein the processor may be further configured to: check whether or not the injected gas is supercooled based on the information on the supply temperature, correct the permissible pressure information based on the ambient temperature information, the tank temperature information and the information on the supply temperature, when a difference between a tank temperature and an ambient temperature exceeds a predetermined range on the basis of the ambient temperature information and the tank temperature information, calculate a maximum gas amount corresponding to the full charge of the fuel tank based on the corrected permissible pressure information, and control the gas charger to fill the gas according to the maximum gas amount.

According to the embodiment of the present disclosure in the moving object, the processor may be further configured to: close a valve of the fuel tank to block filling of the gas, when the maximum possible filling pressure is lower than the current pressure on the basis of the information on the maximum possible filling pressure and information on a current pressure of the fuel tank, provide a message regarding impossibility of filling the gas to the user interface, and implement a process of finish filling the gas in the gas charger.

According to the embodiment of the present disclosure in the moving object, the user interface may provide a current gas amount of the fuel tank and a maximum gas amount corresponding to a full charge of the fuel tank, along with the maximum possible filling amount.

According to the embodiment of the present disclosure in the moving object, the processor may bes further configured to: generate information on an en-route filling station located on a route to adestination, when a distance from a current location of the moving object to the destination is at least longer than a drivable distance on the basis of destination information of the moving object and drivable distance information according to a gas amount of the fuel tank, and provide the information through the user interface.

According to the embodiment of the present disclosure in the moving object, the information on the en-route filling station may be generated based on the filling specification information of the station, along with the destination information and the drivable distance information.

According to the embodiment of the present disclosure in the moving object, the processor may be further configured to: obtain information on a nearest filling station located closest from the destination and generate the information on the en-route filling station, when a total distance, which is obtained by adding the distance to the destination and a distance of a nearest station from the destination to the nearest filling station, is longer than the drivable distance.

According to the embodiment of the present disclosure in the moving object, the information on the en-route filling station may comprise a filling station which makes a residual drivable distance after arrival at the destination longer than the distance of the nearest station.

According to the embodiment of the present disclosure in the moving object, the processor may be further configured to generate driving energy data associated with an expected gas consumption amount for driving on the route based on information on an actual distance to the destination, which is included in the destination information, and the route state information, when route state information is obtained which comprises road state data and traffic congestion data on the route to the destination. The distance to the destination may be calculated by considering the driving energy data.

According to the embodiment of the present disclosure in the moving object, the processor may be further configured to generate driving energy data associated with an expected gas consumption amount for driving on the route based on information on an actual distance to the destination and the altitude information, when altitude information of the current location and the destination is obtained. The distance to the destination may be calculated by considering the driving energy data.

According to the embodiment of the present disclosure in the moving object, when at least one of weather information and driving time information on the route to the destination satisfies a predetermined condition, the processor may be further configured to: calculate a component load energy amount expected by at least one of the weather information and the driving time information, generate component energy data, and calculate expected energy consumption data associated with an expected gas consumption amount for driving on the route based on the destination information and the component energy data. The distance to the destination may be calculated by considering the expected energy consumption data.

According to the embodiment of the present disclosure in the moving object, the component energy data may be calculated based on at least one of an air-conditioning energy amount associated with an air-conditioning system of the moving object and an electric part energy amount associated with an electrical system that comprises lighting of the moving object and a module operating according to weather.

According to the embodiment of the present disclosure in the moving object, the air-conditioning energy amount may be calculated based on a temperature on the route, an amount of solar radiation, and a deviation angle between a radiation direction of the sun and a driving direction of the moving object.

According to the embodiment of the present disclosure in the moving object, the processor may be further configured to generate expected energy consumption data associated with an expected gas consumption amount for driving on the route based on the destination information and average component energy data, when at least one of the weather information and the driving time information on the route to the destination dissatisfies a predetermined condition. The distance to the destination may be calculated by considering the expected energy consumption data.

According to the embodiment of the present disclosure in the moving object, the user interface may be configured to visually provide the information on the en-route filling station so that each filling station has a plurality of items. The filling stations may be arranged based on an item requested according to a user's setting, and the information on the en-route filling station may be provided as a list in which the request item is preferentially placed.

According to the embodiment of the present disclosure in the moving object, the processor may be further configured to: rearrange the list based on an item that the user selects in the list and place the selected item preferentially in the list.

According to another embodiment of the present disclosure, there is provided a method for providing a gas filling amount according to a filling specification of a gas fuel-based moving object, the method comprising: receiving filling specification information of a gas charger; and estimating a maximum possible filling amount of gas injected into a fuel tank of the moving object based on the filling specification information and providing the maximum possible filling amount through a user interface.

According to the present disclosure, it is possible to provide a gas fuel-based moving object capable of providing a user with a maximum possible filling amount of gas injected into the moving object according to a filling specification of a gas filling station and a method for providing a filling amount using the same.

Effects obtained in embodiments of the present disclosure are not limited to the above-mentioned effects, and other effects not mentioned above may be clearly understood by those skilled in the art from the following description.

As discussed, the apparatus and/or method suitably includes use of a controller or processer.

BRIEF DESCRIPTION OF THE DRAWINGS

FIG. 11A and FIG. 11B are views illustrating an example process of generating en-route filling station information.

DETAILED DESCRIPTION

Figure 1:
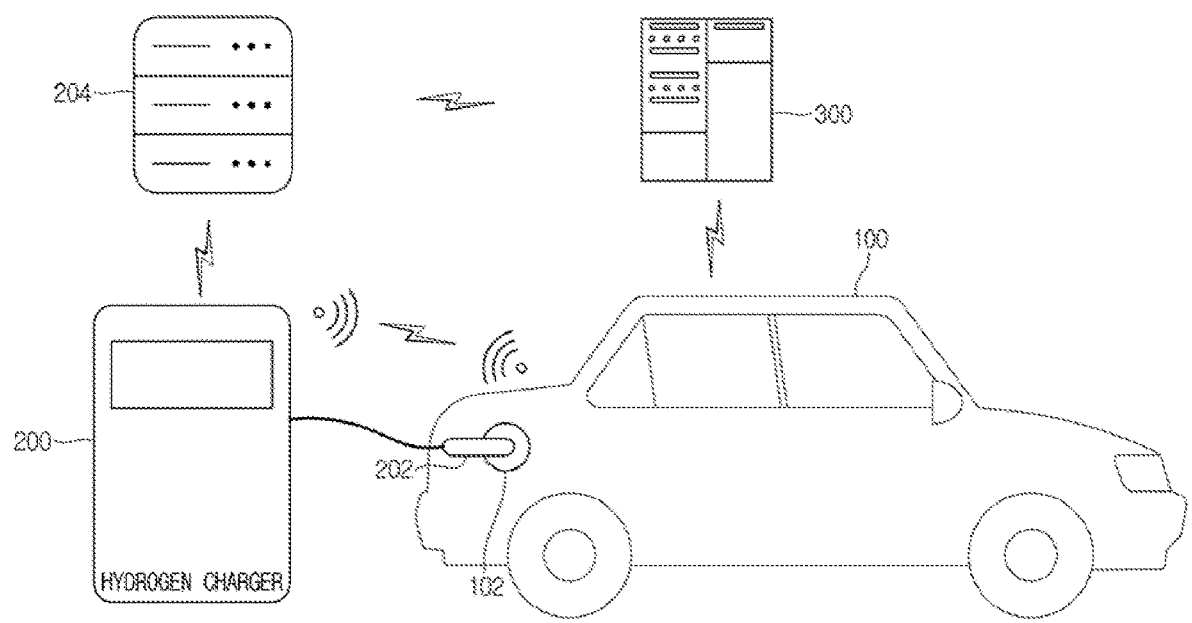
FIG. 1 is a view schematically illustrating a gas-based moving object, a gas charger, and a server communicating therewith.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings so that those skilled in the art may easily implement the present disclosure. However, the present disclosure may be implemented in various different ways and is not limited to the embodiments described therein.

In describing exemplary embodiments of the present disclosure, well-known functions or constructions will not be described in detail since they may unnecessarily obscure the understanding of embodiments of the present disclosure. The same constituent elements in the drawings are denoted by the same reference numerals, and a repeated description of the same elements will be omitted.

In embodiments of the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In embodiments of the present disclosure, the terms first, second, etc. are only used to distinguish one element from another and do not limit the order or the degree of importance between the elements unless specifically mentioned. Accordingly, a first element in an exemplary embodiment could be termed a second element in another embodiment, and, similarly, a second element in an exemplary embodiment could be termed a first element in another embodiment, without departing from the scope of embodiments of the present disclosure.

In embodiments of the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of embodiments of the present disclosure.

In embodiments of the present disclosure, elements described in various embodiments do not necessarily mean essential elements, and some of them may be optional elements. Therefore, an exemplary embodiment composed of a subset of elements described in an exemplary embodiment is also included in the scope of embodiments of the present disclosure. In addition, embodiments including other elements in addition to the elements described in the various embodiments are also included in the scope of embodiments of the present disclosure.

The advantages and features of the present disclosure and the way of attaining them will become apparent with reference to embodiments described below in detail in conjunction with the accompanying drawings. Embodiments, however, may be embodied in many different forms and should not be constructed as being limited to example embodiments set forth herein. Rather, these embodiments are provided so that this disclosure will be complete and will fully convey the scope of the disclosure to those skilled in the art.

Hereinafter, embodiments of the present disclosure will be described with reference to the accompanying drawings.

FIG. 1 is a view schematically illustrating a gas-based moving object, a gas charger, and a server communicating therewith.

A gas-based moving object 100 may receive gas injected from a gas charger 200 in a gas filling station, generate electric energy by using the gas in a fuel cell, and be driven by the electric energy.

For example, the moving object 100 may refer to a device capable of moving. The moving object may be a vehicle, a personal mobility, a mobile office, or a mobile hotel. The vehicle may be a four-wheel car, for example, a sedan, a sports utility vehicle (SUV), and a pickup truck and may also be a car with five or more wheels, for example, a lorry, a container truck, and a heavy vehicle. Once a gas-based fuel cell is mounted on the moving object 100, the moving object 100 may be an aerial moving object, apart from a ground moving object, for example, a drone and a personal aerial vehicle (PAV). The moving object 100 may be embodied by manned driving or autonomous driving (either semi-autonomous or full-autonomous driving). The moving object 100 may use various types of gas capable of generating electric energy from a fuel cell, and the gas may be hydrogen, for example. Hereinafter, for convenience of explanation, the description uses hydrogen as an example but is not limited thereto, and various types of gas are applicable.

A gas filling station may have at least one gas charger 200 prepared in a specific place and intended to supply gas to a moving object. The gas charger 200 may have a charging nozzle 202 connected with a receptacle 102 (or charge port) of the moving object 100. In addition, the gas charger 200 may include a module capable of short range communication with the moving object 100 and a module capable of communicating with a filling station server 204 of the gas filling station. For example, the short range communication may be based on various communication schemes like infrared communication, NFC, WiFi, Bluetooth, beacon or dedicated short range communication (DSRC). When the moving object 100 approaches a predetermined distance range of the gas charger 200 or when the charging nozzle 202 is fitted to the receptacle 102, the gas charger 200 may exchange data with the moving object 100 through short range communication. Communication with the filling station server 204 may be performed through the short range communication or a cellular communication scheme. The filling station server 204 may control the gas charger 200 by receiving the device state information, filling information and charging information of the gas charger 200. In addition, the filling station server 204 may transmit and receive a signal by communicating with the moving object 100 that enters the gas filling station. As described above, when gas is exemplified by hydrogen, the gas filling station and the charger are a hydrogen filling station and a hydrogen charger, and for convenience of explanation, these terms will be used interchangeably in this specification.

Meanwhile, the moving object 100 may communicate with another device or another moving object. Herein, as an example, the moving object may communicate with another device based on cellular communication, WAVE communication, dedicated short range communication (DSRC), or other communication schemes. That is, as a cellular communication network, a communication network such as LTE, 5G, WiFi communication network, WAVE communication network, etc. may be used. In addition, a local area network used in a moving object, such as DSRC may be used, and embodiments of the present disclosure are not limited to the above-described embodiment.

A device may be at least one of a supporting server 300 capable of providing the moving object 100 with various types of information like route information, weather information and filling station information, a roadside unit (RSU) capable of communication on a roadside, and a user device used by a user of the moving object 100. The supporting server 300 may transmit a message and an appropriate control order to the moving object 100 in response to a request and data transmitted from the moving object 100. When the moving object 100 is driving autonomously, the supporting server 300 may perform the driving control, charging guidance and guidance control for the moving object 100 based on route information, weather information and filling station information.

Figure 2:
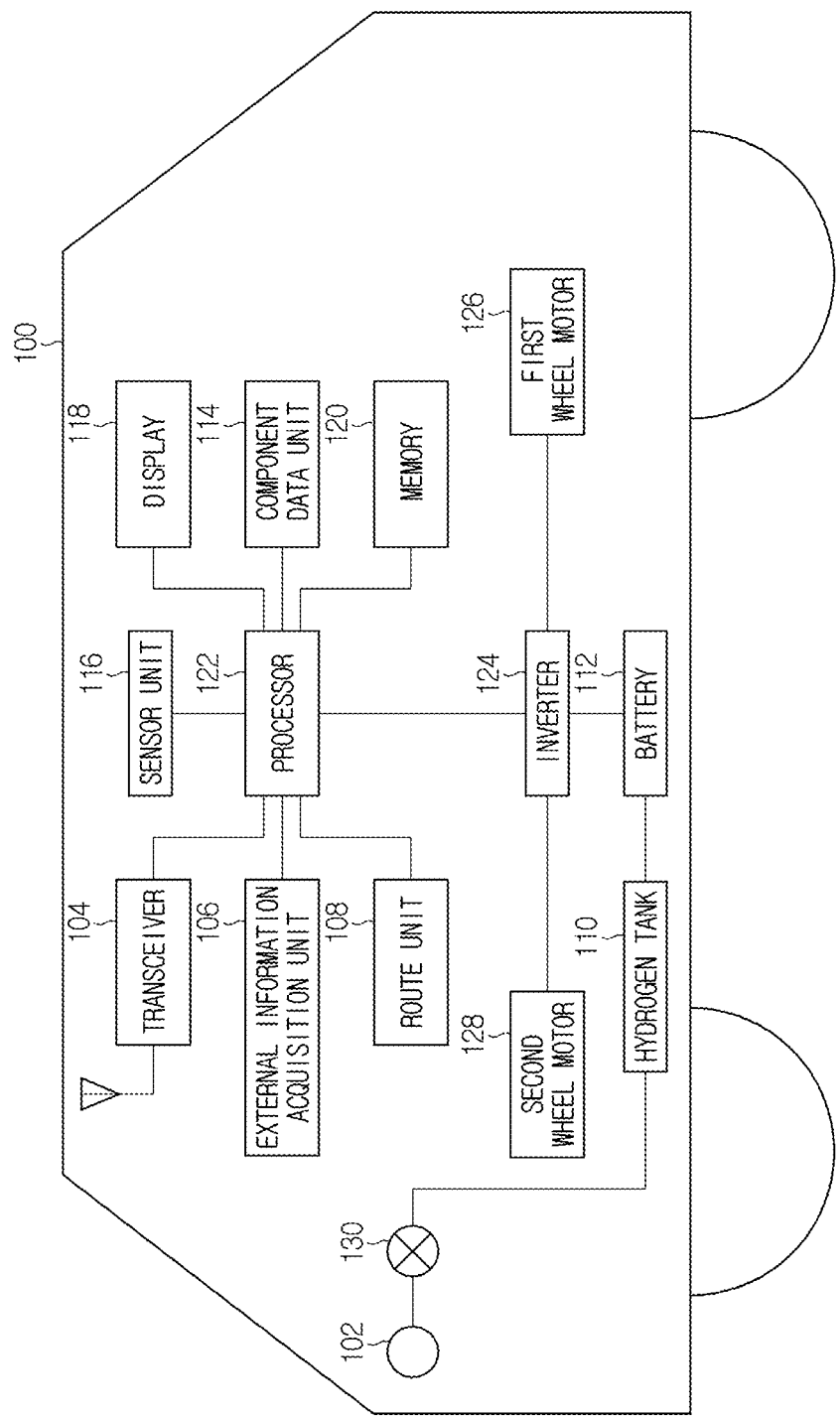
FIG. 2 is a block diagram showing component modules of a moving object according to an exemplary embodiment of the present disclosure.

FIG. 2 is a block diagram showing component modules of a moving object according to an exemplary embodiment of the present disclosure.

The moving object 100 may include a transceiver 104, an external information acquisition unit 106, a route unit 108, a hydrogen tank 110, a battery 112, a component data unit 114, a sensor unit 116, a display 118, a memory 120, and a processor 122.

The transceiver 104 may support mutual communication with the filling station server 204, the hydrogen charger 200, and the supporting server 300. The external information acquisition unit 106 may request and obtain necessary information from the supporting server 300, the filling station server 204 and various external servers and may manage information received through the transceiver 104. For example, the information may be route information including a route to a destination and information on traffic and roads on a route, geographic information associated with a road and a structure around the moving object 100, information on a nearby filling station, weather information according to routes, and charging specification information of each gas filling station, but is not limited to the above-described pieces of information. In response to a user's request to set a route, the route unit 108 may generate and provide route guidance data based on route information to a destination so that the route guidance data may be shown on the display 118.

The hydrogen tank 110 may be a hydrogen-based fuel tank. The hydrogen tank 110 may store hydrogen gas provided from the gas charger 200 through the receptacle 102, and the hydrogen gas thus stored may be provided to a hydrogen source of the battery 112. The sensor unit 116 to be described below may have various sensors, including a pressure sensor of the hydrogen tank 110 and a temperature sensor (not shown) of the hydrogen tank 110, which are capable of measuring the current tank pressure and temperature caused by currently filling hydrogen gas. Based on a current tank pressure, a gas amount of a hydrogen tank may be calculated by a processor 122. A gas check valve 130 may be installed between the receptacle 102 and the hydrogen tank 110. In order to prevent gas from flowing from the hydrogen tank 110 to the gas charger 200, when a maximum possible filling pressure of the gas charger 200 is lower than a current pressure of the hydrogen tank 110, the processor 122 may close the gas check value 130 to block gas filling.

The battery 112 may be a hydrogen fuel cell with a plurality of stacks that generate electric energy through reaction between hydrogen supplied from the hydrogen tank 110 and oxygen from outside and may provide the energy thus generated to the driving, lighting, air-conditioning and many other electrical systems of the moving object 100. The battery 112 may include a first battery capable of providing energy to driving and high-power electrical devices and a second battery capable of charging the first battery as well as providing energy to a low-power device. Herein, the second battery may be composed of the hydrogen fuel cell.

The component data unit 114 may calculate an electric part energy amount in real time which is consumed by an electrical system including a view securing module and a lighting module according to weather conditions like rainfall and snowfall. For example, the view securing module may be a wiper and a defogging device installed on glass or mirror with snowfall or condensation on it. For example, the lighting module may include various lamps of the moving object 100 such as headlights, fog lights and taillights for night. In addition, the component data unit 114 may calculate an air-conditioning energy amount consumed in an air-conditioning system of the moving object 100 in real time. For example, the air-conditioning module may be a heating and cooling apparatus installed in the moving object 100. The component data unit 114 may generate component energy data by calculating a component load energy amount based on at least one of an electric part energy amount and an air-conditioning energy amount in real time.

In addition, the component data unit 114 may generate component energy data by calculating an expected component load energy amount based on at least one of weather information and driving time information on a route to a destination set by a user. For example, an air-conditioning energy amount constituting a component load energy amount may be estimated based on a temperature on a route to a destination, an amount of solar radiation, and a deviation angle between a radiation direction of the sun and a driving direction of the moving object 100. The temperature and the amount of solar radiation may be received from the supporting server 300, which provides relevant data, through the external information acquisition unit 106. The supporting server 300 may calculate the trajectory of the sun based on the route information and the driving time information or store a predetermined average trajectory corresponding to the information. The supporting server 300 may generate radiation direction data of the sun according to the trajectory of the sun. As another example, based on the above information, the supporting server 300 may receive radiation direction data of the sun from an external service server supporting weather information. The supporting server 300 may calculate a deviation angle on a route between a radiation direction of the sun and the moving object 100 based on the radiation direction data, trajectory data of a driving direction of the moving object 100 according to an expected route and reference orientation information and may forward the deviation angle to the moving object 100. As another example, the supporting server 300 may transmit the radiation direction data to the moving object 100, and the moving object 100 may calculate a deviation angle according to a route based on the radiation direction data and trajectory data of a driving direction.

The sensor unit 116 may include a GPS sensor, an ambient temperature sensor, a hydrogen tank temperature sensor, a hydrogen tank pressure sensor, a posture/bearing/direction-related sensor unit (inertial measurement unit (IMU)), and an inertial navigation system (INS), and a sensor detecting various situations not listed herein may be further included.

The display 118 may function as a user interface. The display 118 may display the operation state, control state and charge state of the moving object 100 and information associated with a gas filling station by means of the processor 122. The display 118 may be configured by a touch screen capable of detecting a user input so that it may receive a user's request that gives a command to the processor 122.

The memory 120 may store an application for controlling the moving object 100 and various data so that it may load the application or read and record data at a request of the processor 122.

The processor 122 may perform overall control of the moving object 100 and, in relation to embodiments of the present disclosure, may control operations associated with hydrogen filling and filling station guidance through data exchange with the filling station server 204 and the supporting server 300.

The moving object 100 may include an inverter 124, which converts a particular type of power of the battery 112 into another type and reduces voltage, and first and second wheel motors 126 and 128 configured to drive by receiving power from the inverter 124.

Figure 3:
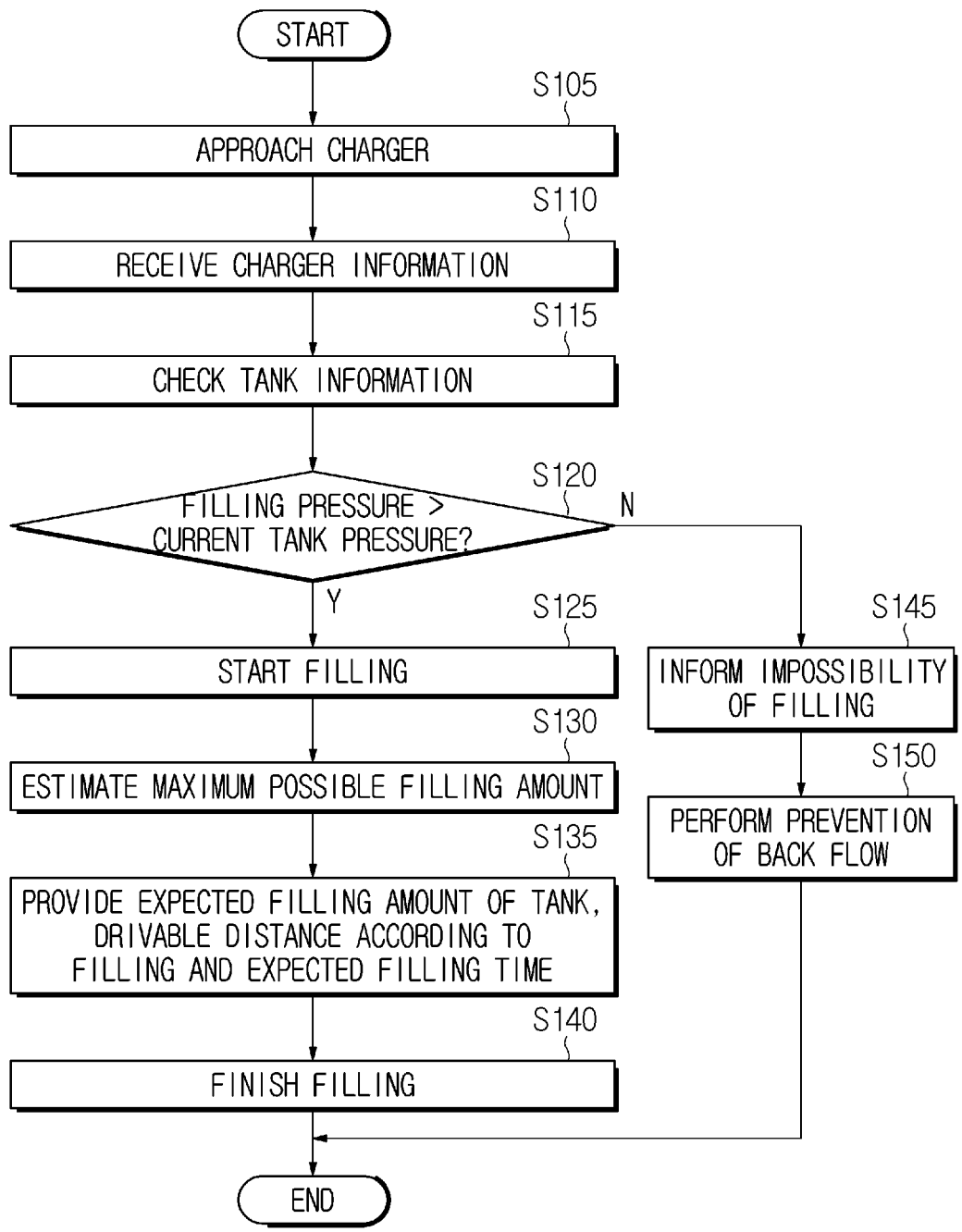
FIG. 3 is a flowchart illustrating a method of providing a gas filling amount of a moving object according to another embodiment of the present disclosure.

FIG. 3 is a flowchart illustrating a method of providing a gas filling amount of a moving object according to another embodiment of the present disclosure.

First, the moving object 100 may approach the gas charger 200 by entering a gas filling station in order to fill hydrogen (S105).

The filling station server 204 may provide a location of the gas charger 200 suitable for the moving object 100 among gas chargers possessed by the filling station to the moving object 100 that enters the filling station. Specifically, the filling station server 204 may implement an authentication and identification process for the moving object 100 and thus receive from the moving object 100, a current hydrogen amount of the hydrogen tank 110, a maximum hydrogen amount corresponding to full charge of the tank 110, permissible pressure information of injected gas corresponding to a full charge amount, and tank information including current pressure and temperature information of the tank 110. Information on a current hydrogen amount, a current pressure and a current temperature may be measured by a pressure sensor and a temperature sensor installed in the tank 110. Information on a maximum hydrogen amount and a permissible pressure may be stored in the memory 120. Permissible pressure information may be differently set in each moving object 100 according to a full charge amount and a structure of the tank 110. The filling station server 204 may analyze filling specification information of each gas charger 200, select at least one gas charger 200 approximately matching tank information and transmit location information of the charger 200 to the moving object 100. For example, filling specification information may include information on a maximum possible filling pressure applied to hydrogen filling by the gas charger and supply temperature information of hydrogen. Like the permissible pressure information of the moving object 100, the information on a maximum possible pressure may be differently set according to each gas charger 200. This is because the gas charger 200 with a maximum filling pressure is provided so that the moving object 100 with a low permissible pressure may be filled with hydrogen more suitably.

Next, the processor 122 of the moving object 100 may receive corresponding filling specification information from the gas charger 200 or the filling station server 204 which the moving object 100 has approached for gas filling (S110). When the gas charger 200 stores specific filling specification information, the gas charger 200 may transmit the specific filling specification information to the moving object 100 through short range communication, for example, communication of an infrared communication module mounted on the charging nozzle 202. The processor 122 may provide the specific filling specification information of the gas charger, to which the moving object has approached, to a display.

Next, the processor 122 of the moving object 100 may check tank information for hydrogen filling (S115).

As described above, the tank information may include a current hydrogen amount, a maximum hydrogen amount, permissible pressure information of injected gas, and current pressure and temperature information of the tank 110.

Next, the processor 122 of the moving object 100 may compare information on a maximum possible filling pressure received from the gas charger 200, to which the moving object 100 has approached, and information on a current pressure of the hydrogen tank 110 and thus may determine whether or not the maximum filling pressure has a higher value than the current pressure (S120).

When the maximum filling pressure is higher than the current pressure, the processor 122 may transmit a filling permission signal to the gas charger 200, and the gas charger 200 may start filling in response to the permission signal (S125).

Next, based on the tank information and the filling specification information of the gas charger 200, the processor 122 may estimate a maximum possible filling amount of hydrogen injected into the tank 110 (S130).

The maximum possible filling amount may be estimated based on permissible pressure information corresponding to a full charge of the hydrogen tank 110 and the information on the maximum possible filling pressure of the gas charger 200. For example, the maximum filling pressure provided by the gas charger 200 is lower than a permissible pressure, the maximum possible filling amount may be estimated as an amount of hydrogen at the maximum filling pressure. When the maximum filling pressure is higher than the permissible pressure, the maximum possible filling amount may be estimated as an amount of hydrogen at the permissible pressure. A possible filling amount and an amount of hydrogen may be calculated as an amount of hydrogen at a pressure corresponding to 25 degrees Celsius, for example, or may be estimated through a value of an experiment performed beforehand in order to check a relation between the pressure and the amount of hydrogen.

In this example, the permissible pressure information may be determined depending on ambient temperature information of the moving object 100 and temperature information of the tank 110, which are obtained during a hydrogen injection process. For example, the ambient temperature information may be obtained through an outdoor temperature sensor included in the sensor unit 116.

As the temperature inside the enclosed hydrogen tank 110 changes the internal pressure of the tank, the internal pressure of the tank may have a significant impact on hydrogen filling in a method of filling hydrogen based on a pressure difference between the gas charger 200 and the hydrogen tank 110. Accordingly, when the internal temperature of the hydrogen tank 110 increases, a hydrogen filling amount and a maximum hydrogen amount are reduced according to the internal temperature and a drivable distance may also be reduced. That is, permissible pressure information and a drivable distance may need to be corrected according to an internal temperature of a tank while being filled.

When the temperature of the tank 110 is higher than an ambient temperature of the moving object 100, the internal pressure of the hydrogen tank 110 increases further due to the high temperature, and permissible pressure information corresponding to a maximum hydrogen amount may be reduced and corrected. Accordingly, a maximum possible filling amount may be estimated based on corrected permissible pressure information and a maximum filling pressure. Thus, the maximum possible filling amount may be estimated as a hydrogen amount corresponding to the permissible pressure, and the maximum possible filling amount may be set to be lower than an uncorrected estimated amount. A corrected value of permissible pressure according to a difference between a temperature of the tank 110 and an ambient temperature may be obtained using the ideal gas equation (PV=nRT).

When the temperature of the tank 110 is lower than an ambient temperature of the moving object 100, the pressure of the hydrogen tank 110 decreases due to the low temperature, and permissible pressure information corresponding to a maximum hydrogen amount may be increased and corrected. Accordingly, a maximum possible filling amount may be estimated based on corrected permissible pressure information and a maximum filling pressure. Thus, the maximum possible filling amount may be estimated as a hydrogen amount corresponding to the permissible pressure, and the maximum possible filling amount may be set to be higher than an uncorrected estimated amount. Consequently, an amount of hydrogen put into the tank 110 may increase by the gas charger 200 at a same pressure.

As another example, the maximum possible filling amount may be estimated based on not only permissible pressure information and maximum possible filling pressure information but also supply temperature information of hydrogen thus injected.

In this example, based on supply temperature information of hydrogen, the processor 122 may check whether or not hydrogen thus injected is supercooled. Based on ambient temperature information and temperature information of the tank 110, when a difference between a tank temperature and an ambient temperature exceeds a predetermined range, the processor 122 may correct the permissible pressure information based on the above pieces of information. For example, when the tank temperature is lower than the ambient temperature, due to a temperature rise of the tank 110 after filling, an internal pressure of the hydrogen tank 110 may become higher than a permissible value of the tank 110. Accordingly, based on the corrected permissible pressure information, the processor 122 may calculate a maximum gas amount corresponding to a full charge of the tank 110. That is, the processor 122 may estimate a maximum possible filling amount based on corrected permissible pressure information and a maximum filling pressure. That is, considering a difference between a temperature of the tank 110 and an ambient temperature of the moving object, the processor 122 may control a valve, for example, the check valve 130 to inject a smaller amount of hydrogen gas than an uncorrected estimated amount or may transmit a control signal to the gas charger 200 to control the injection.

Next, the processor 122 may be configured to provide a user interface with a maximum possible filling amount of hydrogen injected into the tank 110, a current gas amount of the tank 110, and a maximum hydrogen amount corresponding to a full charge of the tank 110 (S135).

Figure 4A:
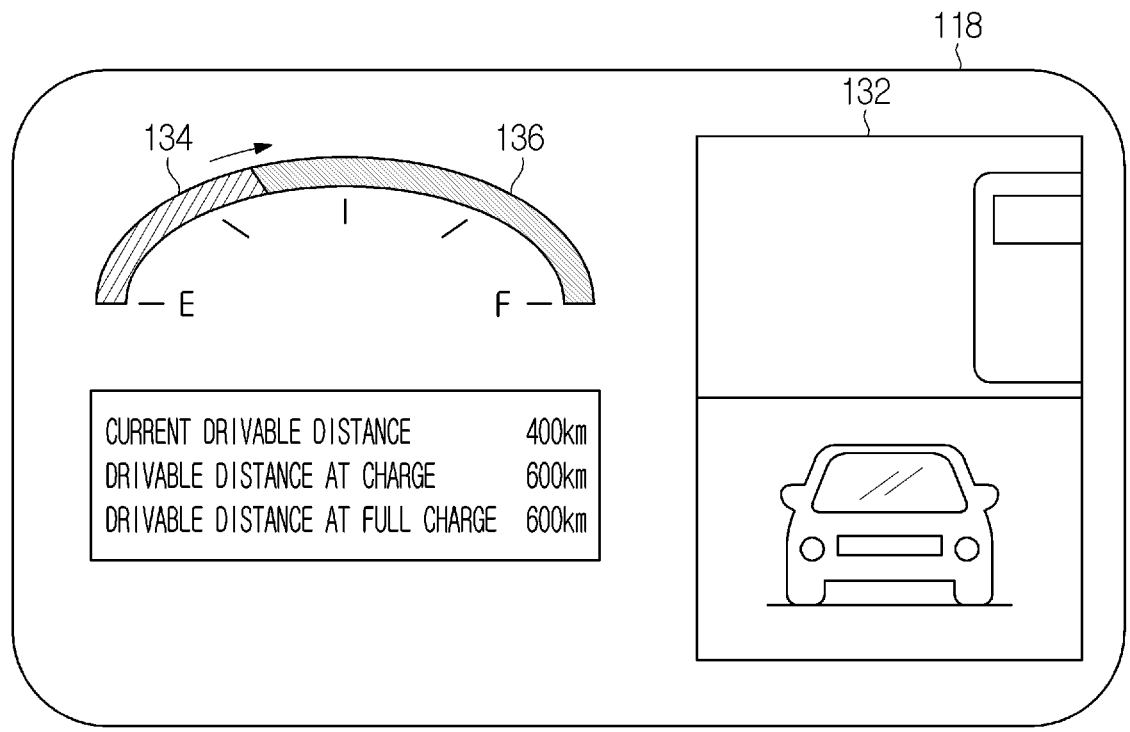
FIG. 4A to FIG. 4C are views exemplifying a user interface of a moving object providing a maximum possible gas filling amount and impossibility of charge.
Figure 4B:
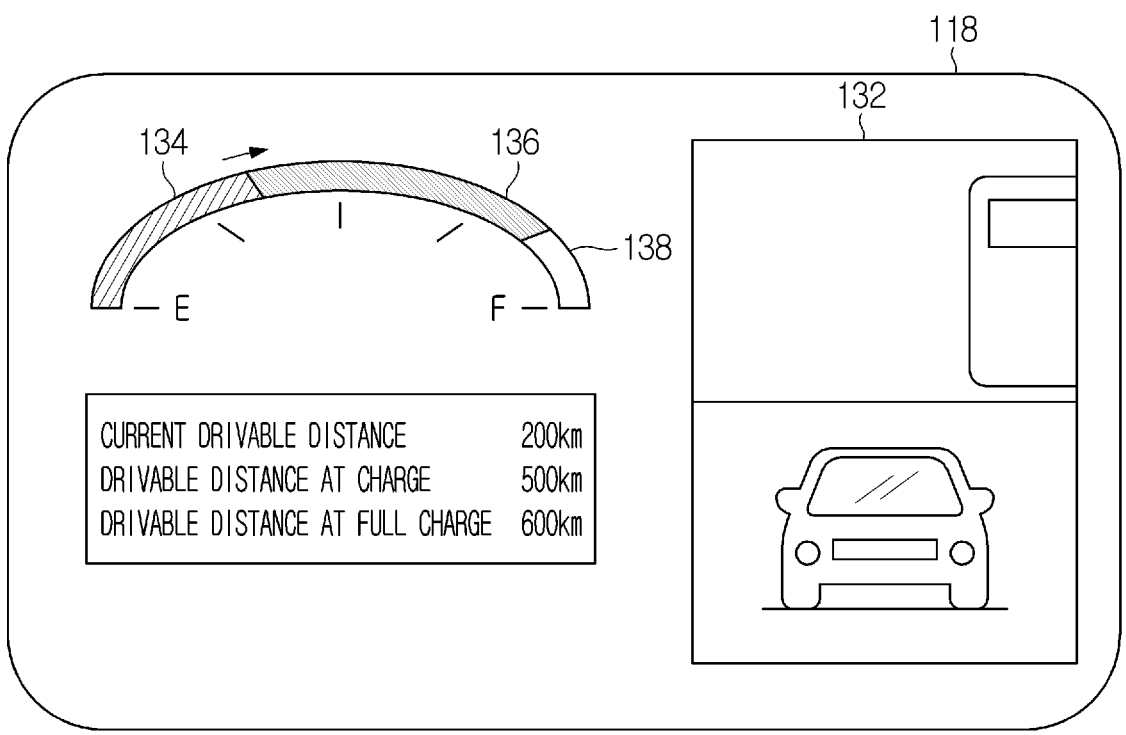
Figure 4C:
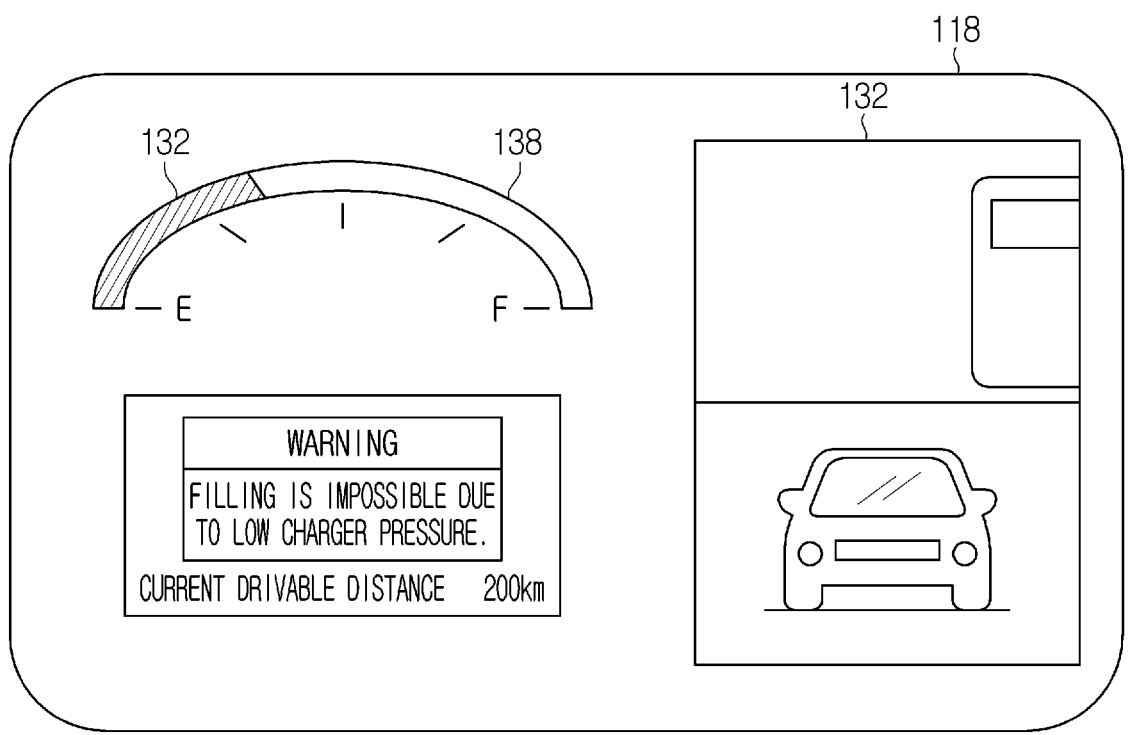

For example, the user interface may be the display 118 and a concrete example associated with it is illustrated in FIG. 4A and FIG. 4B. FIG. 4A to FIG. 4C are views exemplifying a user interface of a moving object providing a maximum possible gas filling amount and impossibility of charge. In FIG. 4, the display 118 may provide information on a filling situation and a surround image screen 132. For example, the surround image screen may be provided in a form of an around view on the display 114. Displaying the information on a filling situation on the display 118 is not limited to the specific examples of FIG. 4, but various modified embodiments are possible.

When a maximum possible filling amount is estimated based on a permissible pressure of the moving object 100, the processor 122 may set the maximum possible filling amount to a maximum hydrogen amount corresponding to a full charge. As illustrated in FIG. 4A, the processor 122 may control the display 118 to display a maximum possible filling amount 136 as a maximum hydrogen amount (F). In addition, the processor 122 may control the display 118 to display a current hydrogen amount 134, which is being currently injected, in real time. In addition to this, in order to enhance the user's convenience, the processor 122 may control the display 118 to show a current drivable distance, a drivable distance at a charge and a drivable distance at a full charge, which correspond to the current hydrogen amount 134, the maximum possible filling amount 136 and the maximum hydrogen amount 138 respectively.

When a maximum possible filling amount is estimated based on a maximum filling pressure of the gas charger 200 of the moving object 100, the processor 122 may set the maximum possible filling amount to a maximum hydrogen amount corresponding to the maximum filling pressure. As illustrated in FIG. 4B, the processor 122 may control the display 118 to display the maximum hydrogen amount (F) 138 and the north maximum possible filling amount 136 that are different from each other. Thus, a user may intuitively see that the gas charger 200 in use is capable of filling hydrogen up to the maximum filling amount 136 but not to the full charge. In addition, the processor 122 may control the display 118 to display a hydrogen amount 134, which is being currently injected, in real time. In addition to this, the processor 122 may control the display 118 to show a current drivable distance, a drivable distance at a charge and a drivable distance at a full charge, which correspond to the current hydrogen amount 134, the maximum possible filling amount 136 and the maximum hydrogen amount 138 respectively.

Next, when the processor 122 confirms that hydrogen is put to the maximum possible filling amount, the processor 122 may be configured to stop and finish filling (S140).

Meanwhile, at step S120, when the maximum filling pressure of the gas charger 200 is lower than a current pressure of the moving object 100, as exemplified in FIG. 4C, the processor 122 may provide the user with a message for informing the impossibility of hydrogen filling (S145).

Next, the processor 122 may close the check valve 130 of the tank 110 to stop filling hydrogen gas and finish gas filling (S150).

In addition to this, the processor 122 may transmit a disallowance signal of filling to the gas charger 200, and the gas charger 200 may stop supplying gas in response to the disallowance signal.

Figure 5:
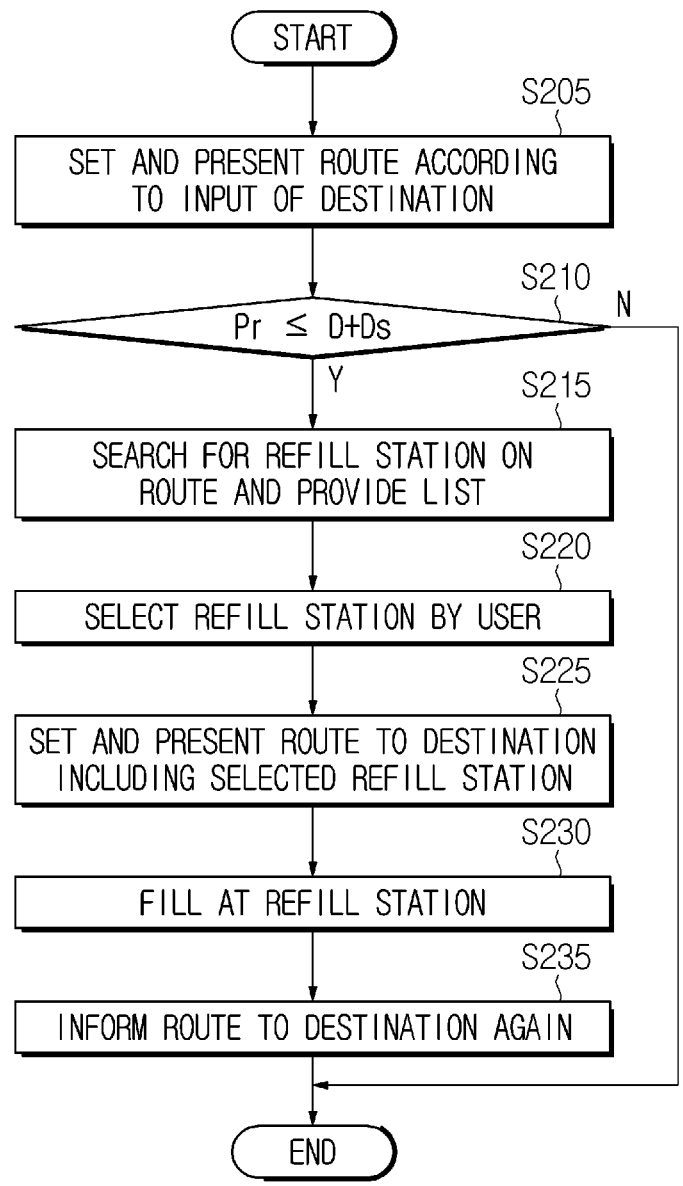
FIG. 5 is a flowchart illustrating a method of guiding a filling station on a route according to another embodiment of the present disclosure.
Figure 6:
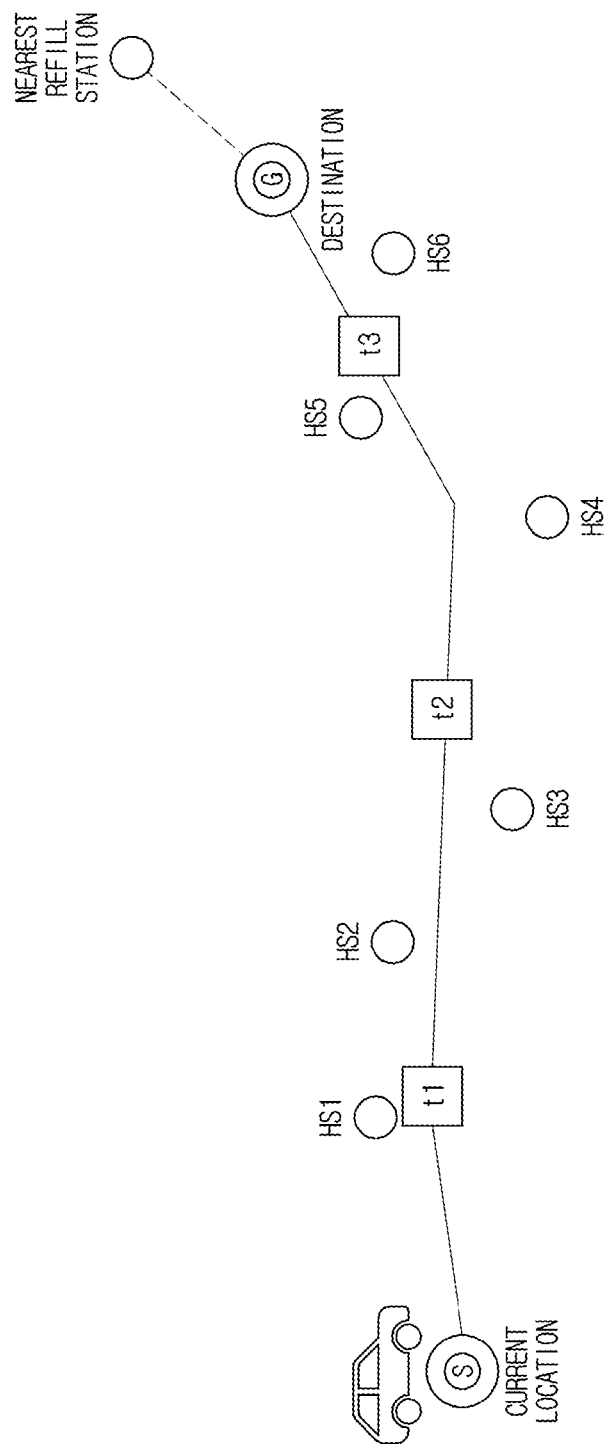
FIG. 6 is a view illustrating a filling station on a route and calculation time for an amount of component load energy.

FIG. 5 is a flowchart illustrating a method of guiding a filling station on a route according to another embodiment of the present disclosure. FIG. 6 is a view illustrating a filling station on a route and calculation time for an amount of component load energy.

First, a user may input a destination through a route guidance menu provided on the display 118, and the route unit 108 may set a route according to an input and show the route in a graphic form (S205).

Next, based on information on a nearest filling station based on current location information, destination information, and drivable distance information, the processor 122 may add a distance to the destination (D) and a distance (Ds) of a nearest station from the destination (S) to the nearest gas filling station and may check whether or not the sum (D+Ds) is larger than the current drivable distance (Pr) (S210).

The current location information may be generated based on a current location (S) on a road obtained from a GPS sensor of the sensor unit 116. The current location information may identify the current location (S) by matching a GPS sensor value with route information to the destination (G) provided by the route unit 108. For example, the current location information may be set to a gas filling station, in which hydrogen filling is performed, or may be designated as a current GPS sensor value obtained at a request of the user or the processor 122. By the processor 122 and the route unit 108, the destination information may be generated to include a location of the destination (G) set according to a user input, a route from the current location (S) to the destination (G), and an actual distance.

The processor 122 may calculate the current drivable distance information based on a current hydrogen amount of the tank 110. The current drivable distance information may be calculated as a usual distance based on the average fuel efficiency and current hydrogen amount of the moving object 100.

The route unit 108 may search for a gas filling station near the destination (S) by using map information. For example, the route unit 108 may obtain information on a nearest gas filling station matching the tank information of the moving object 100 based on information on gas filling stations retrieved from the map information and information on filling specifications of gas chargers installed in each station. By referring to the information on the nearest gas filling station received from the route unit 108, the processor 122 may calculate a distance to the nearest gas filling station, that is, the distance (Ds) of the nearest station (Ds).

Figure 7:
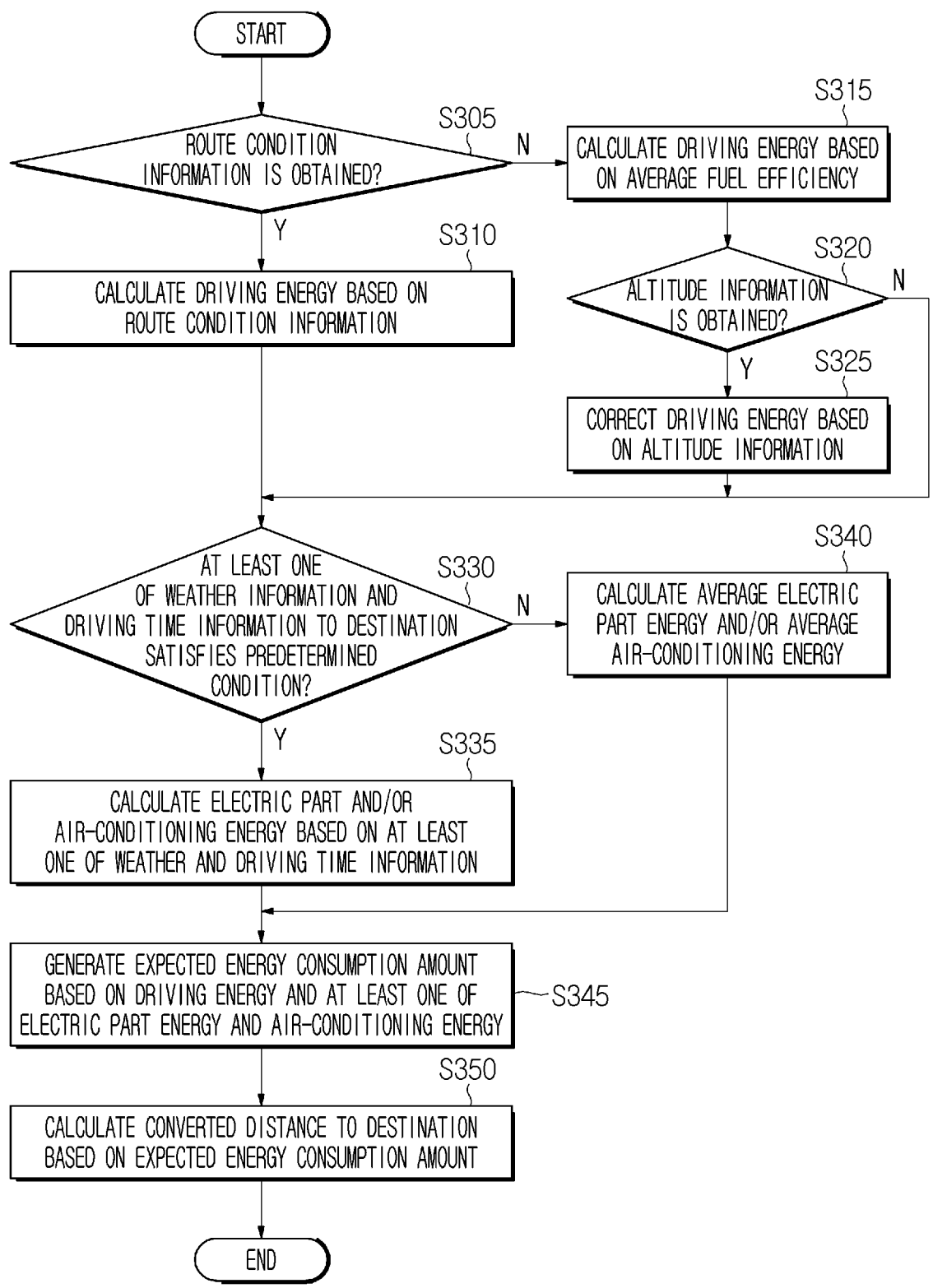
FIG. 7 is a flowchart illustrating a method of calculating energy consumption data expected for driving on a route for calculating a distance to a destination.

In the above example, an actual distance to the destination included in the destination information may be employed as the distance to the destination. As another example, the distance to the destination may be calculated as a converted distance to the destination by considering expected energy consumption data predicted for driving on the route. Another example may be implemented through the process of FIG. 7. FIG. 7 is a flowchart illustrating a method of calculating expected energy consumption data predicted for driving on a route for calculating a converted distance to a destination.

The expected energy consumption data may include driving energy data according to an expected route condition to a destination and component energy data based on an expected weather condition and an expected driving time. As described in FIG. 2, the component energy data may be generated based on an air-conditioning energy amount and an electric part energy amount. The expected energy consumption data, which considers an event on a route, a weather condition, and a range of driving time, may be used to correct a distance to a destination, which employs only information on an actual distance to the destination. Further details will be described with reference to FIG. 7.

Referring to FIG. 7, first, the processor 122 may check whether or not it is possible to obtain route state information from the external information acquisition unit 106 (S305).

The route state information may be an event that actually occurs or is expected on a route to a destination (G). For example, the route state information may include road state data and traffic congestion data, which are identified based on destination information and driving time information. The road state data may include road construction information, road age information, road damage information and road event information. The road construction information may be a number of lanes in each section on a route, a permissible speed, a road gradient, and the like. The road event information may include an accident, a construction work, and the like, which are expected to continue during an expected time of driving. The traffic congestion data may be a degree of congestion, which occurs in a future position on a route or usually occurs in a future section during an expected time of driving, and a passage time of the moving object.

When the processor 122 is capable of obtaining route state information from the external information acquisition unit 106, the processor 122 may calculate driving energy associated with an amount of hydrogen consumption expected for driving on the route based on information on an actual distance to a destination and the route state information (S310).

For example, when a future route has a road with a gradient of a predetermined value or above and traffic congestion always occurs in a specific section of the route during an expected time of driving, the route state information may include the gradient, a degree of congestion of the specific section, a passage time of the specific section, and a speed in the specific section. The driving energy may be calculated based on regular driving energy and additional driving energy. The regular driving energy may be calculated based on an actual distance to the destination and an average fuel efficiency (energy/distance). Corrected driving energy may be estimated based on the route state information. The corrected driving energy may be estimated using correlation data between route state information received from the supporting server 300 and additional energy.

When the processor 122 is incapable of obtaining the route state information, the processor 122 may calculate driving energy based on the average fuel efficiency (energy/distance) (S315).

The driving energy may be regular driving energy based on an average fuel efficiency and an actual distance to the destination.

Next, the processor may check whether or not it is possible to obtain altitude information (S320).

The altitude information may be an altitude difference between a current location (S) and the destination (G). The altitude of each location may be obtained from map information of the route unit 108 or from the supporting server 300, but when the map information or the supporting server 300 does not have the altitude of each location, the processor 122 is incapable of obtaining the altitude information.

When being capable of obtaining the altitude information, the processor 122 may generate the corrected driving energy based on the altitude information and correct the driving energy based on the corrected driving energy (S325).

Specifically, when the destination (G) has a higher altitude than the current location (S), the driving energy may be calculated, for example, by a sum of the regular driving energy and the corrected driving energy according to an altitude difference. For example, the corrected driving energy may be calculated by 9.8 (acceleration of gravity) *the weight of the moving object*the altitude difference*the (driving) efficiency of a power electric (PE) system. Herein, the PE system may be a driving system requiring electric power, including, for example, a first battery used for driving, the inverter 124, and the first- and second-wheel motors 126 and 128. When the destination (G) has a higher altitude than the current location (S), as an additional driving force is needed to enable the moving object 100 to arrive up to the destination, the corrected driving energy may be calculated by multiplying a potential energy value based on the altitude difference and a driving efficiency of the PE system.

When the destination (G) has a lower altitude than the current location (S), the driving energy may be calculated, for example, by subtracting corrected driving energy based on an altitude difference from the regular driving energy. For example, the corrected driving energy may be calculated by 9.8 (acceleration of gravity)*the weight of the moving object*the altitude difference*the (regeneration) efficiency of a power electric (PE) system. When the destination (G) has a lower altitude than the current location (S), as the potential energy of the moving object 100 decreases and the driving energy is regenerated in response to the reduced potential energy, the driving energy may be calculated by using the above process.

Otherwise, when no altitude information is obtained, the processor 122 may determine the regular driving energy calculated at step S315 as driving energy.

After the driving energy is calculated at steps S310, S320 and S325, the processor 122 may determine whether or not at least one of weather information and driving time information on a route to the destination (G) satisfies a predetermined condition (S330).

As exemplified in FIG. 6, the processor 122 may estimate location information predicted along expected driving time (S~t1~t3~D) included in driving time information. In addition, the processor 122 may not only obtain, from the external information acquisition unit 106, weather information including weather forecast information, temperatures, solar radiation amounts and radiation directions of the sun according to location information of the route but also check whether or not a nighttime zone is present in a section of a specific location during an expected driving time.

Figure 8:
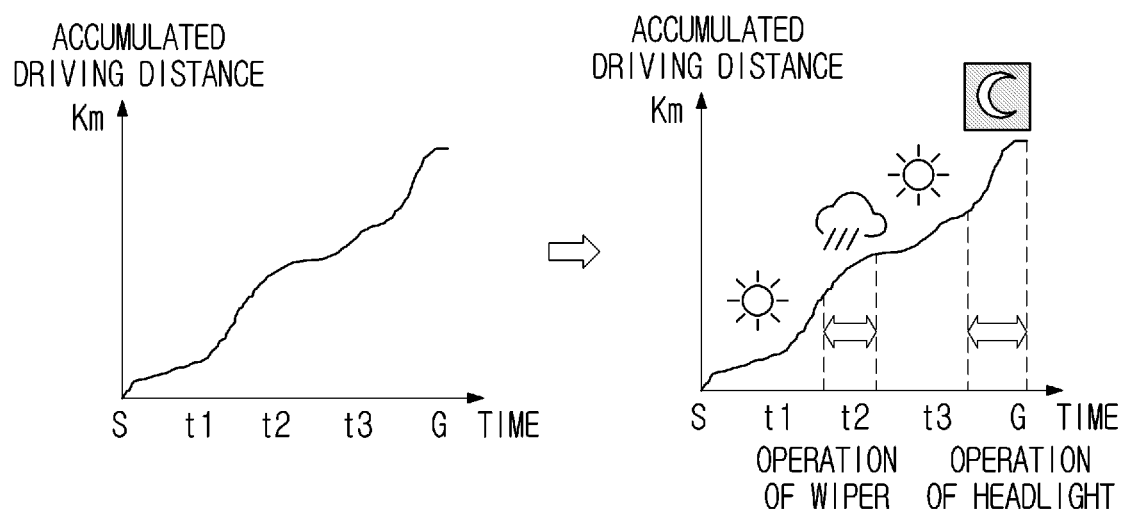
FIG. 8 is a view illustrating an example process of calculating an electric part energy amount.

As exemplified in FIG. 8, the processor 122 may obtain weather information of a rainfall forecast from the external information acquisition unit 106 at a location corresponding to time t2 estimated based on a current velocity of the moving object 100, traffic information and road information. FIG. 8 is a view illustrating an example process of calculating an electric part energy amount. The weather information may include not only weather conditions like clearness, cloudiness, rainfall, snowfall, and fog but also quantified data like an expected amount of rainfall/snowfall. The processor 122 may determine whether or not a rainfall or a temperature predicted at a location of time t2 activates the wiper, defogger, and heating system of the moving object 100. That is, for example, a predetermined condition considered by the processor 122 may be whether or not weather condition activates at least one of an electrical system and an air-conditioning system.

The processor 122 may expect a nighttime zone at a location corresponding to time t4, and the processor 122 may determine whether or not the nighttime zone activates headlights. That is, in addition, a predetermined condition may be whether or not an expected time zone of driving activates at least one of an electrical system and an air-conditioning system.

Figure 9:
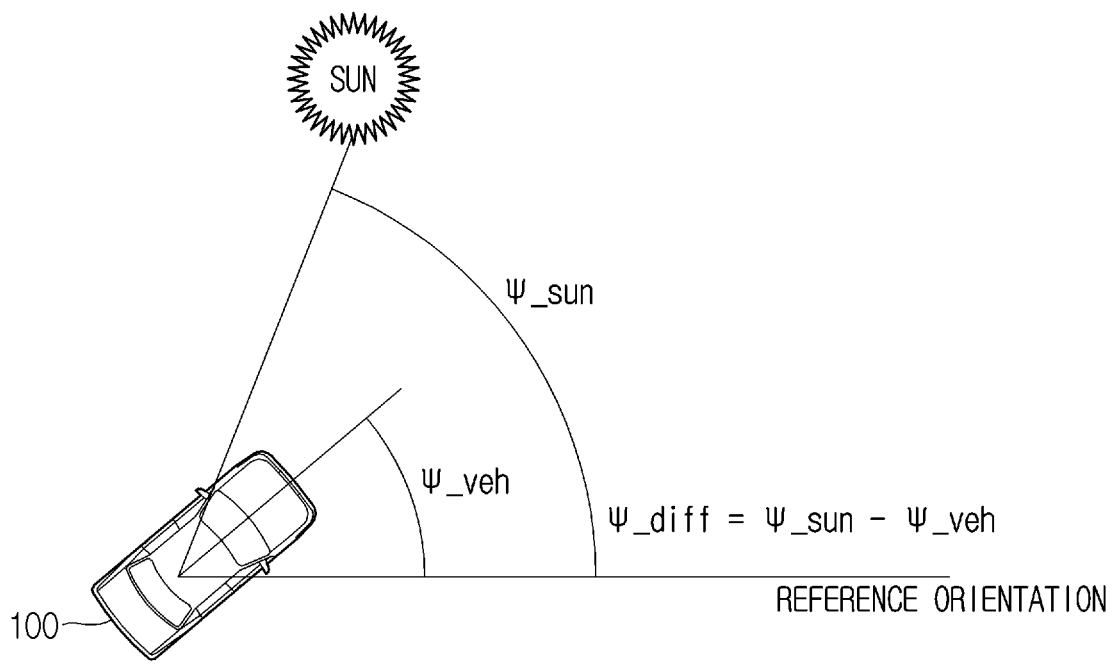
FIG. 9 is a view illustrating an example of obtaining an angle of deviation between the sun and a moving object, which is applied for calculating an air-conditioning energy amount.

As exemplified in FIG. 8 and FIG. 9, the processor 122 may obtain weather information including weather forecast information, temperatures, solar radiation amounts and radiation directions of the sun according to location information expected at expected driving time (S~t1~t3~D) through the external information acquisition unit 106. FIG. 9 is a view illustrating an example of obtaining an angle of deviation between the sun and a moving object, which is applied for calculating an air-conditioning energy amount. For example, when it is expected that the radiation amount has a reference value or above at a high temperature in a section of a specific location and the sunlight radiates actually directly to the moving object, the processor 122 may determine whether or not the expected situation activates a cooling system. For example, the predetermined condition may be whether or not a combination of weather condition and driving time information activates at least one of an electrical system and an air-conditioning system.

When at least one of weather condition and driving time information on a route satisfies a predetermined condition, the component data unit 114 may calculate an electric part energy amount and/or an air-conditioning energy amount on the route based on at least one of the weather conditions and the driving time information (S335). In embodiments of the present disclosure, the component data unit 114 is described to implement the step S335, but the processor 122 may implement this step.

For example, the electric part energy amount may be an estimated/expected energy amount consumed by an electrical system including a view securing module and a lighting module operating according to weather conditions. For example, an air-conditioning energy amount may be an estimated/expected energy amount consumed by a heating and cooling system (air-conditioning system) based on a temperature on a route to a destination, an amount of solar radiation, and a deviation angle between a radiation direction of the sun and a driving direction of the moving object 100. A component load energy amount is calculated by adding the electric part energy amount and the air-conditioning energy amount, and component energy data may be generated based on it.

As described by the example of FIG. 8, the component data unit 114 may estimate an electric part energy amount expected by the operation of a wiper based on a rainfall forecast, an expected rainfall amount, an expected rainfall duration, and a temperature, which are expected at a location of future time t2. In addition, as it is expected that the moving object 100 will run at nighttime at the location of future time t4, the component data unit 114 may estimate an electric part energy amount associated with headlights based on an expected nighttime driving time of the moving object 100.

Figure 10:
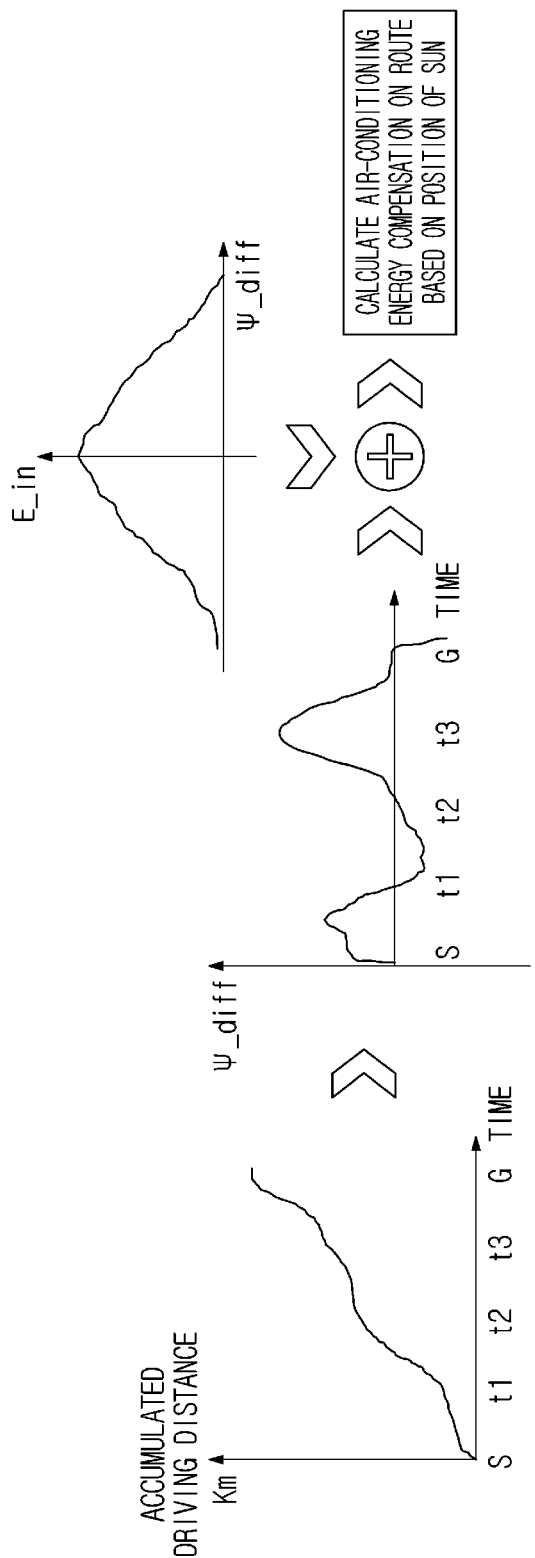
FIG. 10 is a view illustrating an example process of calculating an air-conditioning energy amount.

FIG. 10 is a view illustrating an example process of calculating an air-conditioning energy amount. As exemplified in FIG. 9 and FIG. 10, based on weather forecast information, expected temperatures, expected solar radiation amounts and expected radiation directions of the sun, which are obtained according to location information predicted at expected driving time (S~t1~t3~D), the component data unit 114 may calculate an expected deviation angle (Ψ_diff) between a radiation direction of the sun (Ψ_sun) and a driving direction (Ψ_veh) of the moving object 100. As described in FIG. 2, the radiation direction of the sun (Ψ_sun) may be transmitted from the supporting server 300 and be calculated from a trajectory of the sun according to an expected driving time and an expected location. In addition, for example, the driving direction (Ψ_veh) of the moving object 100 may be estimated based on a road structure of each location recorded on map information of the route unit 108 and a moving direction of the moving object 100. The component data unit 114 may calculate an expected air-conditioning energy amount for a cooling system based on incident energy (E-in) externally calculated according to a deviation of direction between the sun and the moving object 100, along with an expected temperature, an expected solar radiation amount and the expected deviation angle (Ψ_diff) exemplified in FIG. 10.

Meanwhile, at step S330, when none of the weather information and the driving time information on a route satisfies a predetermined condition, the processor 122 may generate expected energy consumption data associated with an expected hydrogen consumption amount for driving on the route based on destination information and an average component energy amount (S340). The average component load energy amount may include an average electric part amount and an average air-conditioning energy amount. For example, the average component load energy amount may employ an average value preset based on an average temperature on the route and an expected driving time zone.

After the steps S335 and S340 are implemented, the processor 122 may generate expected energy consumption data based on and driving energy and at least one of the electric part energy amount and the air-conditioning energy amount (S345).

Next, the processor 122 may calculated a converted distance by considering the expected energy consumption data, and the converted distance may be set as a converted distance to the destination (S350).

Returning to step S210 of FIG. 5, when the current drivable distance (Pr) is not shorter than the sum (D+Ds) of the distance to the destination (D) and the the distance (Ds) of the nearest station (Ds) to the nearest filling station, the route initially set may be maintained without presenting a gas filling station and guiding the route again. Herein, the distance (D) to the destination may be set based on information on an actual distance to the destination and, as shown in FIG. 7, may be determined as a converted distance to the destination based on expected energy consumption data reflecting various conditions and events on the route. The step S210 according to embodiments of the present disclosure is described with the main focus on a comparison between the current drivable distance (Pr) and the sum. In step S210 according to another alternative example, the current drivable distance (Pr) may be determined by being compared with the distance (D) to the destination.

When the current drivable distance (Pr) is equal to or below the sum, the processor 122 may search for gas filling stations on the route and provide a list of filling stations (S215).

FIG. 11A and FIG. 11B are views illustrating an example process of generating en-route filling station information.

As exemplified in FIG. 6, the processor 122 may obtain location information of gas filling stations HS1 to HS6 located within a predetermined range on a route by referring to map information. The processor 122 may obtain the map information and information on filling stations transmitted from the filling station server 204 of each gas filling station HS1 to HS6. At a request of the moving object 100, filling station information may be collected through support of the supporting server 300. The filling station information may include location information of filling stations, filling specification information of the filling stations, and price information (fuel unit price).

The processor 122 may select information on filling stations matching tank information of the moving object 100 based on a current hydrogen amount of the tank 110 and select gas filling stations HS1 to HS5 corresponding to the selected information. As exemplified in FIG. 11A, for each of the selected gas filling stations HS1 to HS6, the processor 122 may arrange a distance from a current location, a drivable distance (Dr) after arrival at a destination, a fuel unit price (Co), and an expected arrival time (Td) at the destination via a corresponding filling station. The drivable distance (Dr) after arrival to the destination may be a residual drivable distance, which the moving object 100 can run from the destination (G), when the moving object 100 is filled with hydrogen up to a current amount above a predetermined amount.

Next, as exemplified in FIG. 11B, the processor 122 may select, among the gas filling stations illustrated in FIG. 11A, filling stations HS1 to H5 which enable the residual drivable distance after arrival at the destination to be longer than the distance (Ds) of the nearest station to a nearest filling station. In FIG. 11A and FIG. 11B, as the the distance (Ds) of the nearest station is 45 km, the gas filling station HS6 with a residual drivable distance of 40 km is excluded from a final list. Although the gas filling station HS6 is near the current location, hydrogen filling after a short driving distance makes a possible filling amount of the tank 110 excessively small so that the residual drivable distance may be short. Unnecessary filling may be prevented by finally selecting gas filling stations in consideration of the residual drivable distance and a distance from the current location to a filling station. Furthermore, the tank 110 has a small residual amount of hydrogen in it, filling efficiency may be good.

Figure 12:
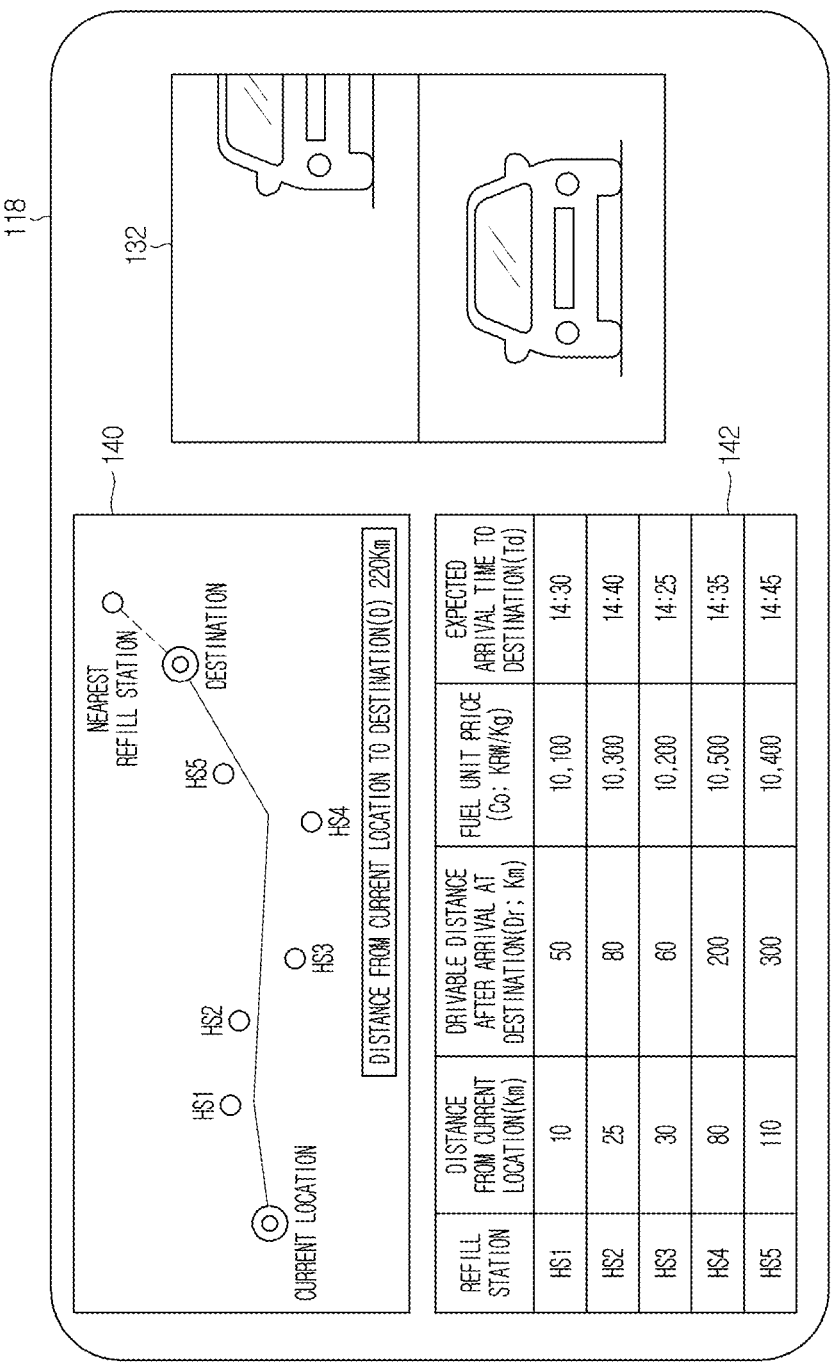
FIG. 12 is a view illustrating an example user interface which provides en-route filling station information in a list form.

The processor 122 may determine the gas filling stations HS1 to HS5 of FIG. 11B as final en-route filling station information and, as exemplified in FIG. 12, may visually provide the en-route filling station information in a list form to a user interface, for example, the display 118.

FIG. 12 is a view illustrating an example user interface which provides en-route filling station information in a list form.

In order to enable a location of a selected filling station to be intuitively identified, the display 118 may display not only a rough location 140 on the route but also a filling station list 142 including various pieces of information for each gas filling station based on the en-route filling station information. In addition, apart from the en-route filling station information, the display 118 may provide a condition of the moving object 100, the surround image screen 132, information on the filling station list 142 shown in FIG. 12, and the rough location 140, which are mere examples and may be provided in various forms.

Gas filling stations shown in the list 142 may be arranged based on the user's priority order setting or items designated as an initial setting of the processor 122. For example, when the user's priority order setting is an arrangement from a closest distance from a current location, in order to draw the user's attention, the en-route filling station information may be arranged according to the user's setting, as shown in FIG. 12, from the closet distance from the current location to a further distance.

Next, the user may transmit an input of selecting one of the filling stations listed in the filling station list 142 to the processor 122 (S220).

The user may select a filling station from the currently arranged list 142 and, as another example, may change the arrangement of filling stations in the list 142 through a predetermined operation.

Figure 13A:
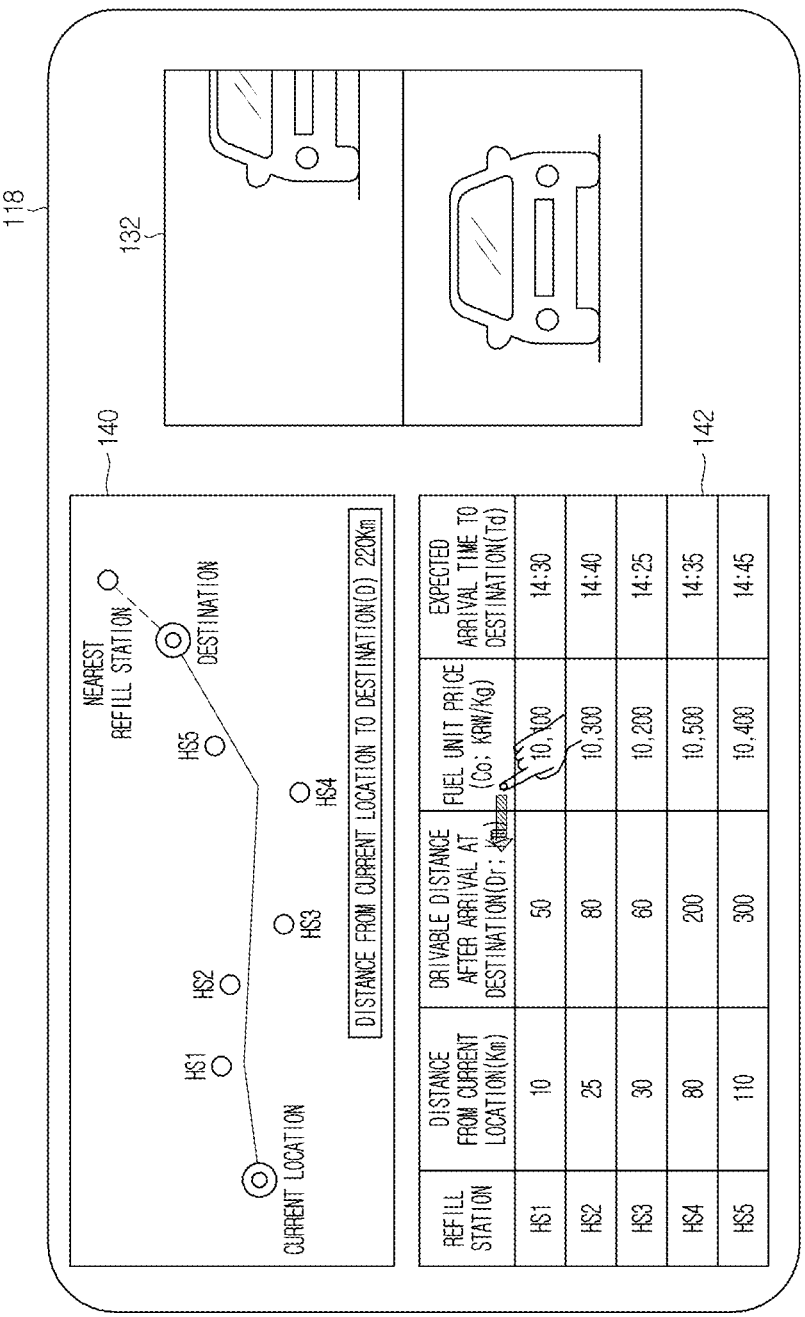
FIG. 13A to FIG. 13C are views illustrating an example user interface which implements a preferred arrangement of an item selected by a user and a rearrangement of filling stations in a list according to the selected item.
Figure 13B:
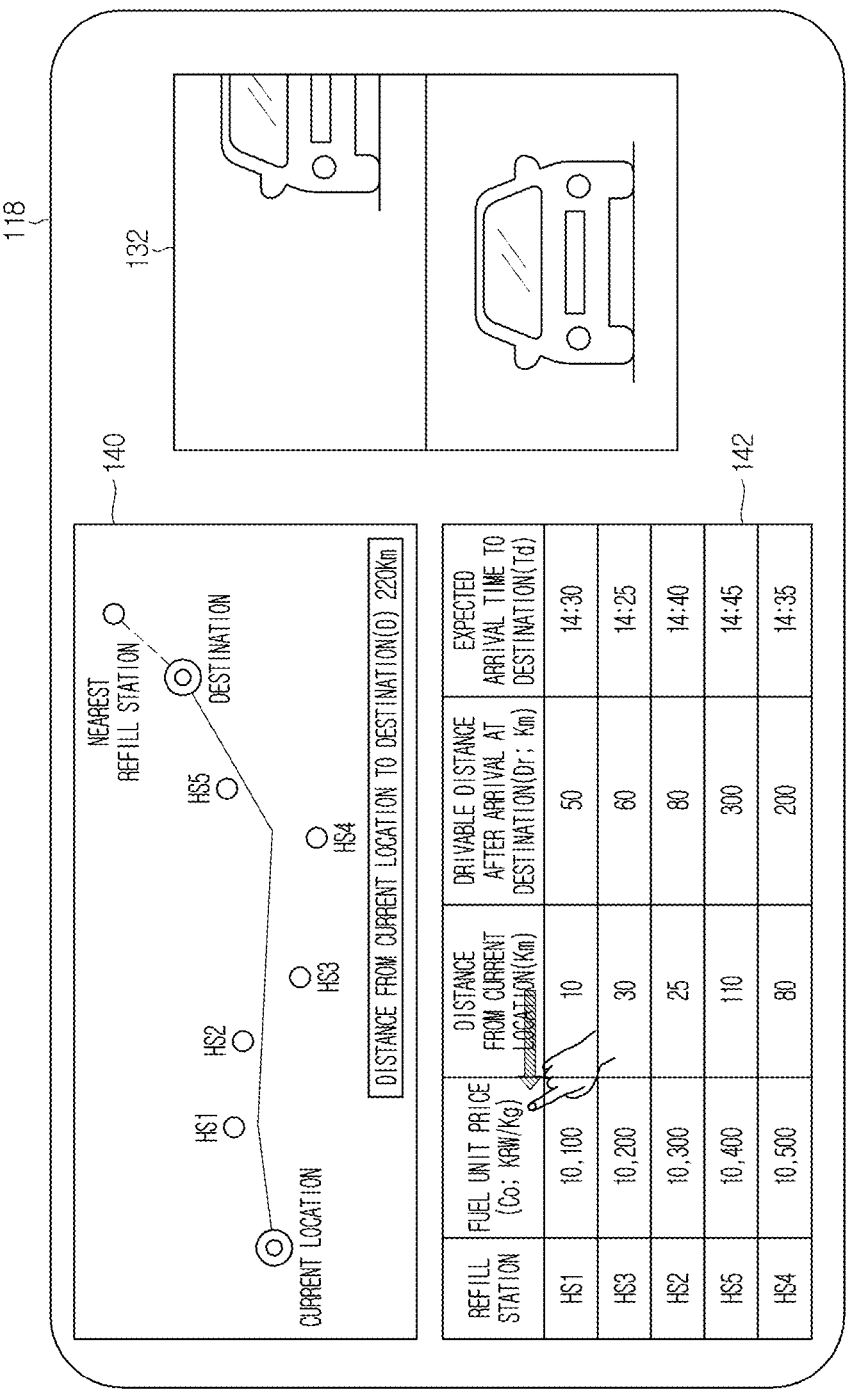
Figure 13C:
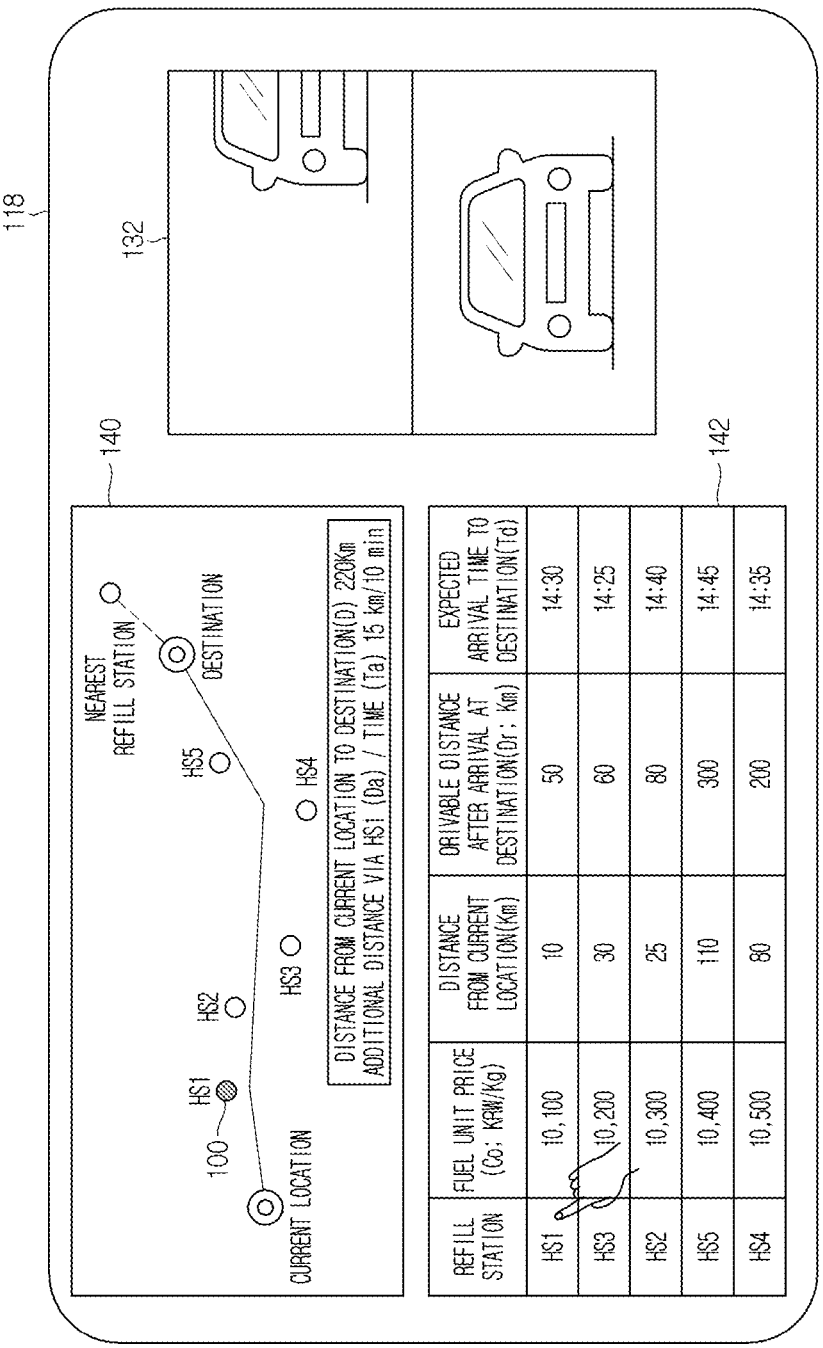

FIG. 13A to FIG. 13C are views illustrating an example user interface which implements a preferred arrangement of an item selected by a user and a rearrangement of filling stations in a list according to the selected item.

As exemplified in FIG. 13A, the user may select items indicated in the list, for example, a fuel unit price field and may drag the field to make it correspond to an interface operation protocol.

As exemplified in FIG. 13B, the processor 122 may move the fuel unit price filed to the left of the list 142 according to a drag input and may change an arrangement form of the list 142 to a rearrangement from the lowest fuel unit price to a higher unit price.

As exemplified in FIG. 13C, when the processor 122 detects the user's completion of drag input, the processor 122 may display the list 142 with rearranged lists on the display 118 in order to enable the user to easily see a low fuel unit price in which the user is interested.

Next, the user may select the gas filling station HS1 144 in the rearranged list 142 or at the rough location 140.

Embodiments of the present disclosure show an example of rearranging items of the list 142 by a drag & drop operation but is not limited thereto and does not exclude various types of rearranging items.

Next, by controlling the route unit 108, the processor 122 may reset a route to the destination (G) including a gas filling station selected by the user and present the route through the display 118 (S225).

Next, when the user enters the filling station selected according to the reset route and fills hydrogen gas (S230) and the filling is completed, the processor 122 may guide the route from the filling station to the destination again by controlling the route unit 108 and the display 118.

Effects obtained in embodiments of the present disclosure are not limited to the above-mentioned effects, and other effects not mentioned above may be clearly understood by those skilled in the art from the following description.

While the exemplary methods of embodiments of the present disclosure described above are represented as a series of operations for clarity of description, it is not intended to limit the order in which the steps are performed, and the steps may be performed simultaneously or in different order as necessary. In order to implement the method according to embodiments of the present disclosure, the described steps may further include other steps, may include remaining steps except for some of the steps, or may include other additional steps except for some of the steps.

The various embodiments of the present disclosure are not a list of all possible combinations and are intended to describe representative embodiments of the present disclosure, and the matters described in the various embodiments may be applied independently or in combination of two or more.

In addition, various embodiments of the present disclosure may be implemented in hardware, firmware, software, or a combination thereof. In the case of implementing the present disclosure by hardware, embodiments of the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. A moving object based on gas fuel and capable of checking an amount of gas filling according to a filling specification, the moving object comprising:
   a transceiver configured to receive filling specification information of a gas charger; and
   a processor configured to estimate, based on the filling specification information, a maximum possible filling amount of gas injected to a fuel tank of the moving object and provide the maximum possible filling amount through a user interface,
   wherein the processor is further configured to:
      generate information on an en-route filling station located destination, when a distance from a current location of the moving object to the destination is at least longer than a drivable distance on the basis of destination information of the moving object and drivable distance information according to a gas amount of the fuel tank, and
      provide the information through the user interface.

2. The moving object of claim 1, wherein the filling specification information comprises at least one of information on a maximum possible filling pressure applied to gas injection by the gas charger and information on a supply temperature of the injected gas.

3. The moving object of claim 2, wherein the maximum possible filling amount is estimated based on permissible pressure information corresponding to a full charge of the fuel tank, the information on the maximum possible filling pressure, and the information on the supply temperature.

4. The moving object of claim 3, wherein the permissible pressure information is determined depending on ambient temperature information of the moving object and tank temperature information of the fuel tank, which are obtained during the gas injection.

5. The moving object of claim 4, wherein the processor is further configured to:
   check whether or not the injected gas is supercooled based on the information on the supply temperature,
   correct the permissible pressure information based on the ambient temperature information, the tank temperature information, and the information on the supply temperature, when a difference between a tank temperature and an ambient temperature exceeds a predetermined range on the basis of the ambient temperature information and the tank temperature information,
   calculate a maximum gas amount corresponding to the full charge of the fuel tank based on the corrected permissible pressure information, and
   control the gas charger to fill the gas according to the maximum gas amount.

6. The moving object of claim 2, wherein the processor is further configured to:
   close a valve of the fuel tank to block filling of the gas, when the maximum possible filling pressure is lower than the current pressure on the basis of the information on the maximum possible filling pressure and information on a current pressure of the fuel tank,
   provide a message regarding impossibility of filling the gas to the user interface, and
   implement a process of finish filling the gas in the gas charger.

7. The moving object of claim 1, wherein the user interface provides a current gas amount of the fuel tank and a maximum gas amount corresponding to a full charge of the fuel tank, along with the maximum possible filling amount.

8. The moving object of claim 1, wherein the information on the en-route filling station is generated based on the filling specification information of the station, along with the destination information and the drivable distance information.

9. The moving object of claim 1, wherein the processor is further configured to:
   obtain information on a nearest filling station located closest from the destination, and
   generate the information on the en-route filling station, when a total distance, which is obtained by adding the distance to the destination and a distance of a nearest station from the destination to the nearest filling station, is longer than the drivable distance.

10. The moving object of claim 9, wherein the information on the en-route filling station comprises a filling station which makes a residual drivable distance after arrival at the destination longer than the distance of the nearest station.

11. The moving object of claim 1, wherein the processor is further configured to generate driving energy data associated with an expected gas consumption amount for driving on the route based on information on an actual distance to the destination, which is included in the destination information, and the route state information, when route state information is obtained which comprises road state data and traffic congestion data on the route to the destination, and
   wherein the distance to the destination is calculated by considering the driving energy data.

12. The moving object of claim 1, wherein the processor is further configured to generate driving energy data associated with an expected gas consumption amount for driving on the route based on information on an actual distance to the destination and the altitude information, when altitude information of the current location and the destination is obtained, and
   wherein the distance to the destination is calculated by considering the driving energy data.

13. The moving object of claim 1, wherein, when at least one of weather information and driving time information on the route to the destination satisfies a predetermined condition, the processor is further configured to:
   calculate a component load energy amount expected by at least one of the weather information and the driving time information,
   generate component energy data, and
   calculate expected energy consumption data associated with an expected gas consumption amount for driving on the route based on the destination information and the component energy data; and
   wherein the distance to the destination is calculated by considering the expected energy consumption data.

14. The moving object of claim 13, wherein the component energy data is calculated based on at least one of an air-conditioning energy amount associated with an air-conditioning system of the moving object and an electric part energy amount associated with an electrical system that comprises lighting of the moving object and a module operating according to weather.

15. The moving object of claim 14, wherein the air-conditioning energy amount is calculated based on a temperature on the route, an amount of solar radiation, and a deviation angle between a radiation direction of the sun and a driving direction of the moving object.

16. The moving object of claim 13, wherein the processor is further configured to generate expected energy consumption data associated with an expected gas consumption amount for driving on the route based on the destination information and average component energy data, when at least one of the weather information and the driving time information on the route to the destination dissatisfies a predetermined condition, and
   wherein the distance to the destination is calculated by considering the expected energy consumption data.

17. The moving object of claim 1, wherein the user interface is configured to visually provide the information on the en-route filling station so that each filling station has a plurality of items,
   wherein filling stations are arranged based on an item requested according to a user's setting, and the information on the en-route filling station is provided as a list in which the request item is preferentially placed.

18. The moving object of claim 17, wherein the processor is further configured to:
   rearrange the list based on an item that the user selects in the list, and
   place the selected item preferentially in the list.

19. A method for providing a gas filling amount according to a filling specification of a gas fuel-based moving object, the method comprising:
   receiving filling specification information of a gas charger; and
   estimating a maximum possible filling amount of gas injected into a fuel tank of the moving object based on the filling specification information and providing the maximum possible filling amount through a user interface;
   generating information on an en-route filling station located on a route to a destination, when a distance from a current location moving object the destination is at least longer than a drivable distance on the basis of destination information of the moving object and drivable distance information according to a gas amount of the fuel tank, and
   provide the information through the user interface.

* * * * *